United States Patent [19]
Ozawa et al.

[11] Patent Number: 6,115,137
[45] Date of Patent: Sep. 5, 2000

[54] IMAGE PROCESSING SYSTEM, DIGITAL CAMERA, AND PRINTING APPARATUS

[75] Inventors: Isamu Ozawa, Kawasaki; Kuniaki Ohtsuka, Yokohama, both of Japan

[73] Assignee: Canon Kabushiki Kaisha, Tokyo, Japan

[21] Appl. No.: 08/984,304

[22] Filed: Dec. 3, 1997

[30] Foreign Application Priority Data

Dec. 6, 1996 [JP] Japan .................................. 8-326730
Dec. 27, 1996 [JP] Japan .................................. 8-358602

[51] Int. Cl.⁷ ....................................................... B41B 15/00
[52] U.S. Cl. ........................... 358/1.6; 358/1.1; 358/1.14; 358/296; 358/501; 358/502; 382/237; 348/211; 348/212; 348/213; 348/231
[58] Field of Search ..................................... 395/106, 114, 395/101; 358/501, 502, 296, 1.1, 1.6, 1.14; 382/237; 348/231, 211–213

[56] References Cited

U.S. PATENT DOCUMENTS

| | | | |
|---|---|---|---|
| 4,544,259 | 10/1985 | Kanaoka et al. ............................. | 355/1 |
| 5,327,257 | 7/1994 | Hrytzak et al. .......................... | 358/447 |
| 5,442,512 | 8/1995 | Bradbury ................................. | 361/683 |
| 5,541,656 | 7/1996 | Kare et al. ............................... | 348/334 |
| 5,706,110 | 1/1998 | Nykanen .................................. | 359/110 |
| 5,737,453 | 4/1998 | Ostromoukhov ........................ | 382/275 |
| 5,847,836 | 12/1998 | Suzuki .................................... | 358/296 |
| 5,916,287 | 6/1999 | Arjomand et al. ........................ | 701/29 |

OTHER PUBLICATIONS

"PSF V3R1.0 for OS/390 Introduction", 1999.

*Primary Examiner*—Mark K. Zimmerman
*Assistant Examiner*—Lance W. Sealey
*Attorney, Agent, or Firm*—Morgan & Finnegan, LLP

[57] ABSTRACT

In order to print an image sensed by a digital camera using a printing apparatus for forming an image on a print medium, image data corresponding to the sensed image is converted into print data, and the converted data is transmitted to the printing apparatus, thereby providing an image processing system which can print an image sensed by the digital camera using the printing apparatus without the intervention of any computer, and a digital camera and printing apparatus suitable for the image processing system.

110 Claims, 33 Drawing Sheets

LIQUID CRYSTAL PANEL OF CAMERA

PRINTOUT

ZOOM DISPLAY

LIQUID CRYSTAL PANEL OF CAMERA

PRINTOUT

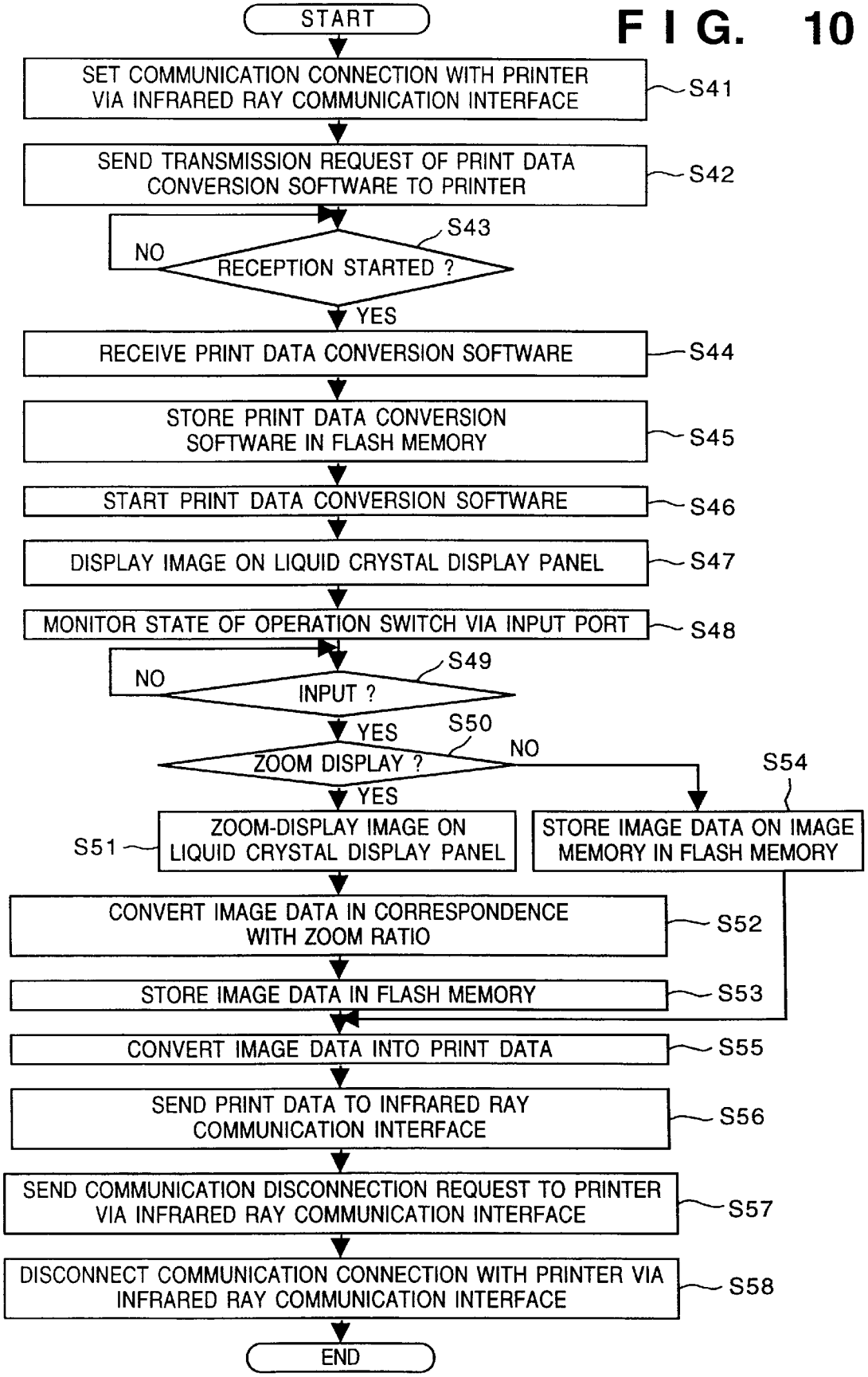

IMAGE PROCESSING SYSTEM, DIGITAL CAMERA, AND PRINTING APPARATUS

BACKGROUND OF THE INVENTION

1. Field of the Invention

The present invention relates to an image processing system for processing an image sensed by a digital camera to be printed by a printing apparatus, and a digital camera and printing apparatus suitable for the image processing system.

2. Description of the Related Art

In general, when an image sensed by a digital camera is output to a printer as one of printing apparatuses, a personal computer (to be abbreviated as a "PC" hereinafter) is used. The PC captures image data from the digital camera, converts the captured image data into print data that can be processed by the printer, and thereafter, outputs the converted print data to the printer.

This processing will be described in detail below with reference to FIG. 15. FIG. 15 shows the arrangement of the image processing system.

As shown in FIG. 15, the image processing system is built by a digital camera 110, PC 112, and printer 114. The digital camera 110 and PC 112 are connected to each other via a communication cable 116 such as an RS232C cable. On the other hand, the PC 112 and printer 114 are connected to each other via a communication cable 118 such as a Centronics cable.

An image sensed by the digital camera 110 is temporarily stored as image data in a flash memory attached to the digital camera 110. When the sensed image is to be printed, the digital camera 110 and PC 112 are connected using the communication cable 116, and communication software installed on the PC 112 is started. Communications between the PC 112 and digital camera 110 are done via the communication software, and the image data stored in the flash memory of the digital camera 110 is transmitted to the PC 112 via the communication cable 116. The transmitted image data is temporarily stored in a hard disk or the like of the PC 112.

When the image data transmitted from the digital camera 110 is stored in the PC 112, the PC 112 starts a printer driver for the printer 114, the image data captured from the digital camera 110 is converted into print data that can be printed by the printer 114 via the printer driver, and the converted print data is output to the printer 114 via the communication cable 118. The printer 114 receives the print data via the communication cable 118, and prints an image converted into the print data onto a print paper sheet.

However, in the above-mentioned image processing system, in order to capture image data sensed by the digital camera 110 into the PC 112, connection of the communication cable 116, start of the communication software, start of the printer driver for converting the captured image data into print data and outputting the converted print data, and the like must be done, and operations for printing an image sensed by the digital camera 110 are complicated.

SUMMARY OF THE INVENTION

It is an object of the present invention to provide an image processing system which allows a digital camera to transmit image data to a printing apparatus without the intervention of any computer.

In order to achieve the above object, according to a preferred embodiment of the present invention, there is disclosed an image processing system having a digital camera for sensing an image and generating image data, and a printing apparatus for printing an image on a print medium on the basis of print data, wherein the digital camera comprises: data conversion means for converting the image data into the print data; and first communication means for communicating with the printing apparatus, and the printing apparatus comprises: second communication means for communicating with the digital camera.

Also, there is disclosed an image processing system having a digital camera for sensing an image and generating image data, and a printing apparatus for printing an image on a print medium on the basis of print data, wherein the digital camera comprises: first communication means for communicating with the printing apparatus; and execution means for executing software received by the first communication means, the printing apparatus comprises: second communication means for communicating with the digital camera; and storage means for storing data conversion software for converting the image data into the print data, and the printing apparatus transmits the data conversion software to the digital camera.

It is another object of the present invention to provide an image processing system which allows a printing apparatus to print an image sensed by a digital camera without requiring any complicated operations.

In order to achieve the above object, according to a preferred embodiment of the present invention, there is disclosed an image processing system having a digital camera for sensing an image and generating image data, and a printing apparatus for printing an image on a print medium on the basis of print data, wherein the digital camera comprises: data conversion means for converting the image data into the print data; and first communication means for communicating with the printing apparatus, and the printing apparatus comprises: second communication means for communicating with the digital camera.

Also, there is disclosed an image processing system having a digital camera for sensing an image and generating image data, and a printing apparatus for printing an image on a print medium on the basis of print data, wherein the digital camera comprises: first communication means for communicating with the printing apparatus; and execution means for executing software received by the first communication means, the printing apparatus comprises: second communication means for communicating with the digital camera; and storage means for storing data conversion software for converting the image data into the print data, and the printing apparatus transmits the data conversion software to the digital camera.

It is still another object of the present invention to provide a digital camera and printing apparatus suitably used in the image processing system.

In order to achieve the above object, according to a preferred embodiment of the present invention, there is disclosed an image processing system having a digital camera for sensing an image and generating image data, and a printing apparatus for printing an image on a print medium on the basis of print data, wherein the digital camera comprises: data conversion means for converting the image data into the print data; and first communication means for communicating with the printing apparatus, and the printing apparatus comprises: second communication means for communicating with the digital camera.

Also, there is disclosed a digital camera for an image processing system having a digital camera for sensing an image and generating image data, and a printing apparatus for printing an image on a print medium on the basis of print data, comprising: communication means for communicating with the printing apparatus, wherein the image data is transmitted to the printing apparatus via the communication means.

Furthermore, there is disclosed a printing apparatus for an image processing system having a digital camera for sensing an image and generating image data, and a printing apparatus for printing an image on a print medium on the basis of print data, comprising: communication means for communicating with the digital camera; and data conversion means for converting image data received by the communication means into print data, wherein when the image data is received from the digital camera via the communication means, the data conversion means is started.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a flow chart showing the operation for printing a zoom-displayed image in a zoom state;

DESCRIPTION OF THE PREFERRED EMBODIMENT

The preferred embodiments of the present invention will be described hereinafter with reference to the accompanying drawings.

FIRST EMBODIMENT

Figure 1:
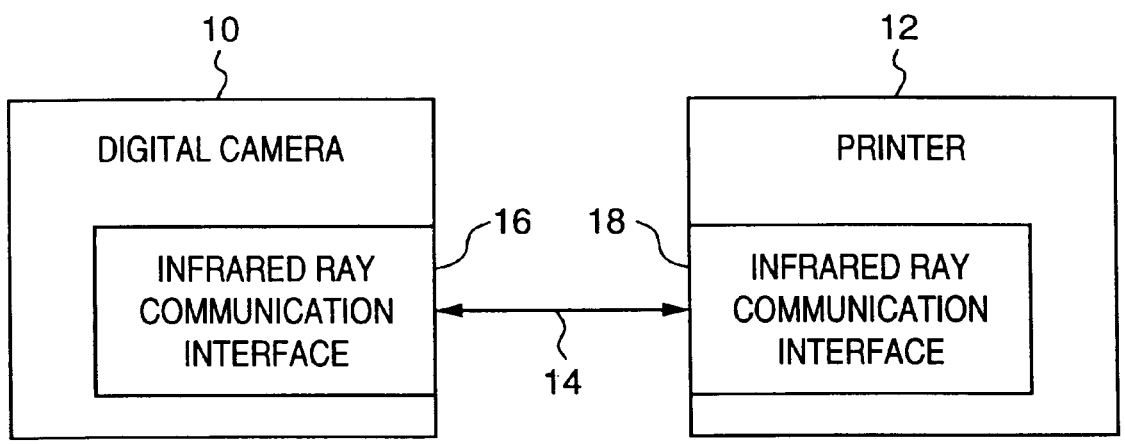
FIG. 1 is a block diagram showing the arrangement of an image processing system according to the first embodiment of the present invention.

FIG. 1 is a block diagram showing the arrangement of an image processing system according to the first embodiment of the present invention. A digital camera 10 and printer 12 respectively have infrared ray communication interfaces 16 and 18 that allow inter-communications via infrared rays 14. The digital camera 10 transmits image data to be printed as an infrared ray signal to the printer 12 via the infrared ray communication interface 16. The printer 12 receives the infrared ray signal by the infrared ray communication interface 18, and prints the received image data.

Figure 2:
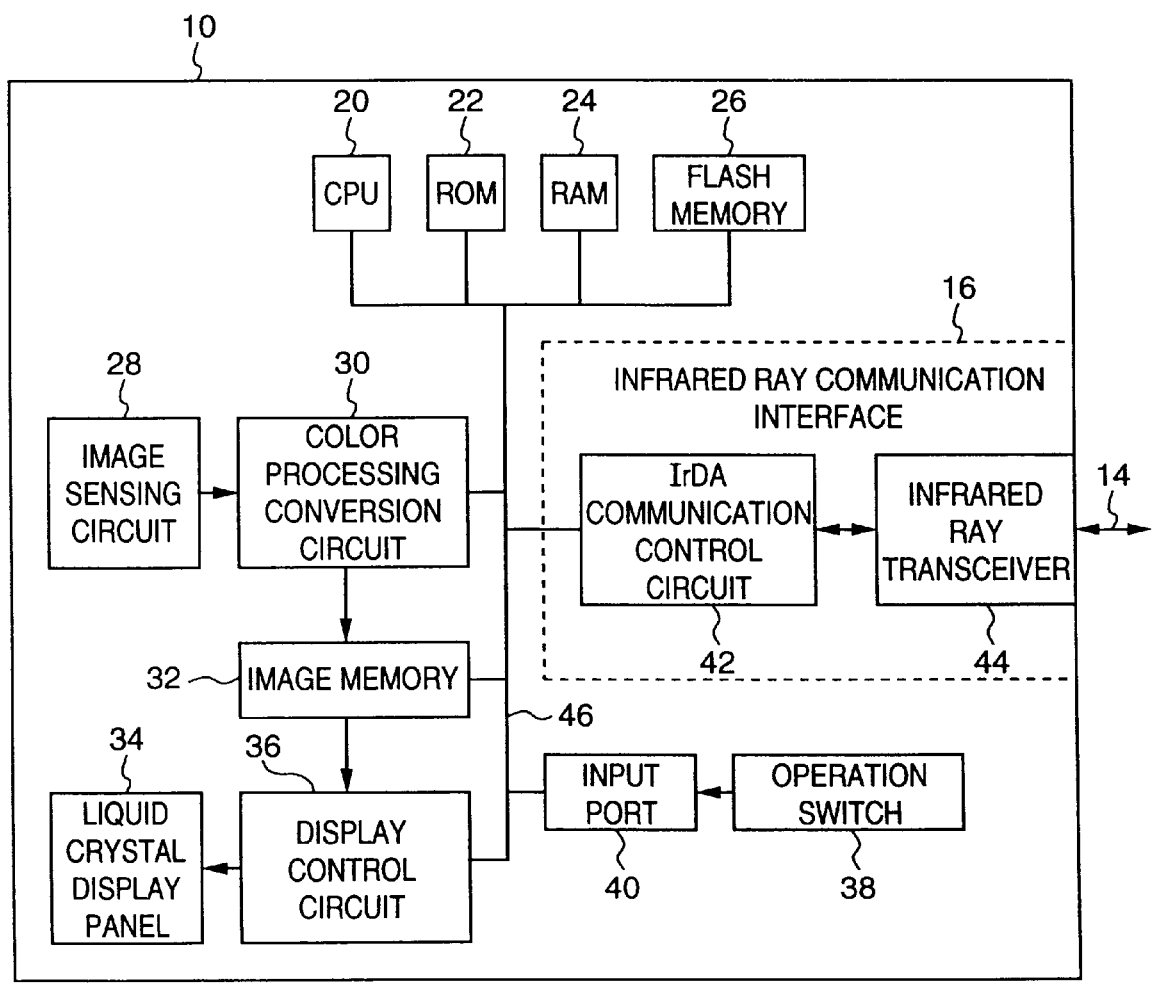
FIG. 2 is a block diagram showing the arrangement of a digital camera 10 shown in FIG. 1.

FIG. 2 is a block diagram showing the arrangement of the digital camera 10 shown in FIG. 1. Reference numeral 20 denotes a CPU for controlling the overall digital camera 10; 22, a ROM that stores various programs executed by the CPU 20 and data; 24, a RAM used by the CPU 20 as a work memory; and 26, a flash memory for storing sensed image data. Reference numeral 28 denotes an image sensing circuit for photoelectrically converting an object optical image, and outputting the converted digital video signal; 30, a color processing conversion circuit for performing color processing conversion of the digital video signal output from the image sensing circuit 28 under the control of the CPU 20, and outputting the color-converted image data to an image memory 32; 34, a liquid crystal display panel which serves as a finder, and a reproduction display means of an image stored in the flash memory 26, and displays image data and the like; 36, a display control circuit for controlling display of the liquid crystal panel 34 under the control of the CPU 20; 38, operation switches (a shutter switch, mode conversion switch, power switch, image data selection switch, and the like) used by the user to operate the digital camera 10; and 40, an input port for receiving a signal input from each of the operation switches 38.

Reference numeral 42 denotes an IrDA communication control circuit for performing modulation/demodulation and serial communication control based on IrDA (Infrared Data Association) communication as one of infrared ray communication schemes and exchanging an electrical signal with an infrared ray transceiver 44. The infrared ray transceiver 44 converts an electrical signal output from the IrDA communication control circuit 42 into an infrared ray signal and transmits the converted signal. Also, the transceiver 44 converts an infrared ray signal received from the printer 12 into an electrical signal, and outputs the converted signal to the IrDA communication control circuit 42. The IrDA communication control circuit 42 and infrared ray transceiver 44 constitute the infrared ray communication interface 16.

Reference numeral 46 denotes an internal bus that interconnects the CPU 20, ROM 22, RAM 24, flash memory 26, color processing conversion circuit 30, image memory 32, display control circuit 36, input port 38, and IrDA communication control circuit 44.

Figure 3:
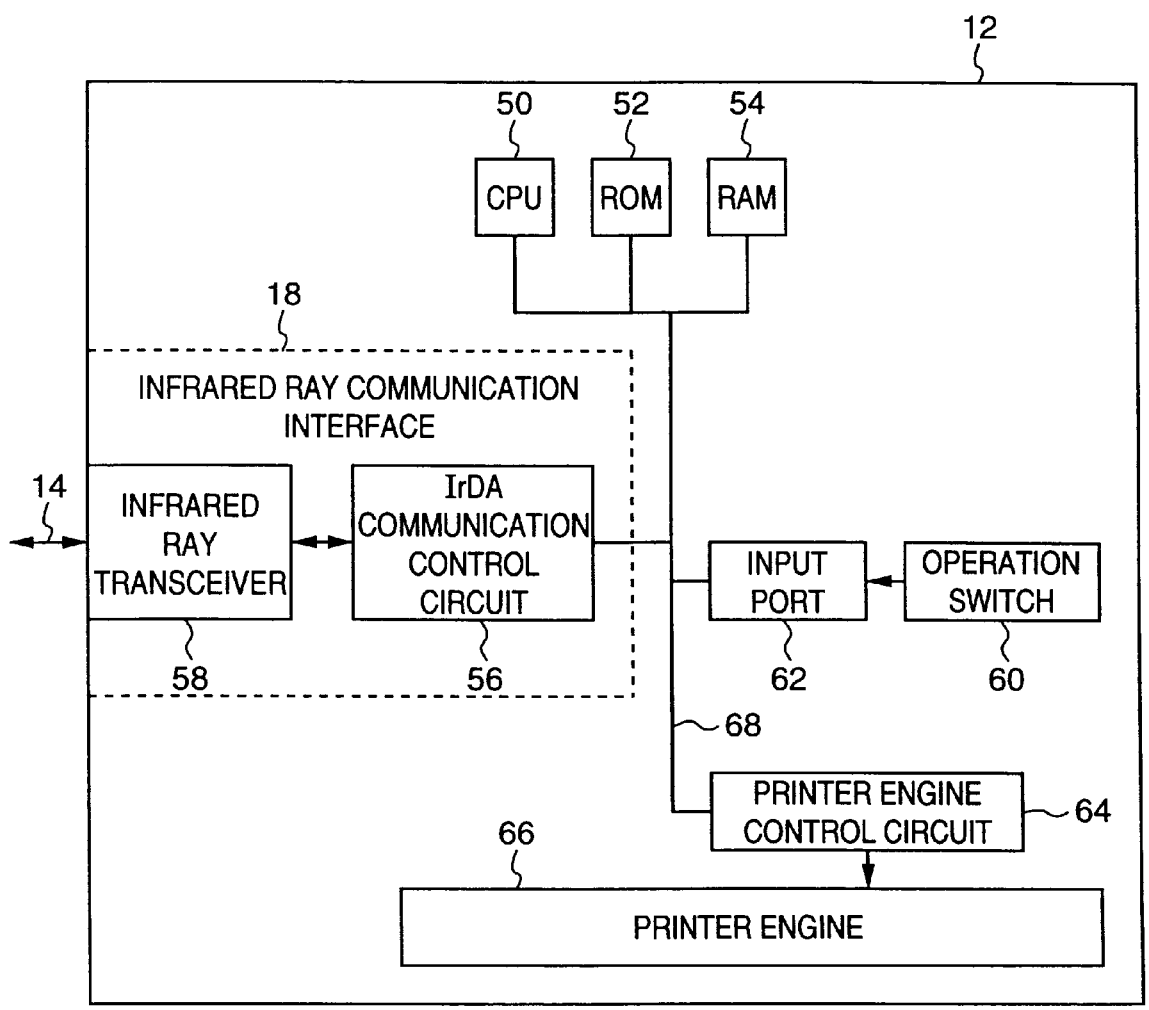
FIG. 3 is a block diagram showing the arrangement of a printer 12 shown in FIG. 1.

FIG. 3 is a block diagram showing the arrangement of the printer 12 shown in FIG. 1. Reference numeral 50 denotes a CPU for controlling the overall printer 12; 52, a ROM that stores various programs to be executed by the CPU 50 and data; and 54, a RAM used by the CPU 50 as a work memory. Reference numeral 56 denotes an IrDA communication control circuit having the same function as that of the IrDA communication control circuit 42; and 58, an infrared ray transceiver for converting an electrical signal from the IrDA communication control circuit 56 into an infrared ray signal and transmitting the converted signal, and converting an infrared ray signal from an external device into an electrical signal and outputting the converted signal to the IrDA communication control circuit 56. The IrDA communication control circuit 56 and infrared ray transceiver 58 make up the infrared ray communication interface 18. Reference numeral 60 denote various operation switches including a power switch, paper discharge switch, and the like; 62, an input port for inputting the operation states of the operation switches 60; and 64, a printer engine control circuit for controlling a printer engine 66 to print print data.

The CPU 50, ROM 52, RAM 54, IrDA communication control circuit 56, input port 62, and printer engine control circuit 64 are connected to each other via an internal bus 68.

The basic operation of the digital camera 10 will be explained below. An image captured by the image sensing circuit 28 is converted into image data of a predetermined format by the color processing conversion circuit 30, and the converted image data is temporarily stored in the image memory 32. Before the shutter is pressed, the image data stored in the image memory 32 is displayed on the liquid crystal display panel 34 under the control of the display control circuit 36. More specifically, the liquid crystal display panel 34 serves as a finder. When the user has pressed the shutter included in the operation switches 38, that operation is transmitted to the CPU 20 via the input port 40 and internal bus 46, and the CPU 20 transfers the stored contents of the image memory 32 to the flash memory 26. In this manner, the sensed image data is stored in the flash memory 26.

Figure 4:
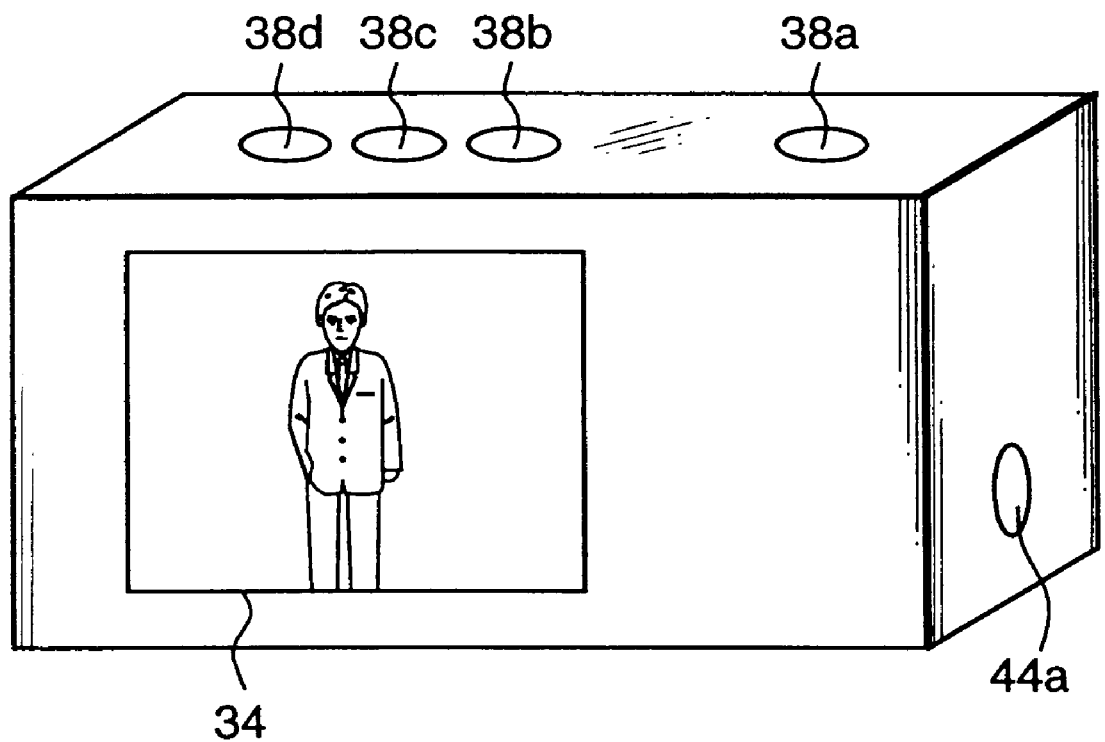
FIG. 4 is a perspective view showing the outer appearance of the digital camera 10.

FIG. 4 shows the outer appearance of the digital camera 10. The same reference numerals in FIG. 4 denote the same parts as in FIG. 2. Reference numeral 44a denotes an infrared ray filter which transmits infrared rays, and is disposed to cover the light-emitting surface and light-receiving surface of the infrared ray transceiver 44. Reference numeral 38a denotes a shutter button included in the operation switches 38; and 38b, 38c, and 38d, switches used for designating a liquid crystal display mode, selecting the image to be displayed, and so on, and included in the operation switches 38.

Processing for transmitting image data from the digital camera 10 to the printer 12 via infrared ray communications and printing the transmitted image data will be explained below.

Figure 5:
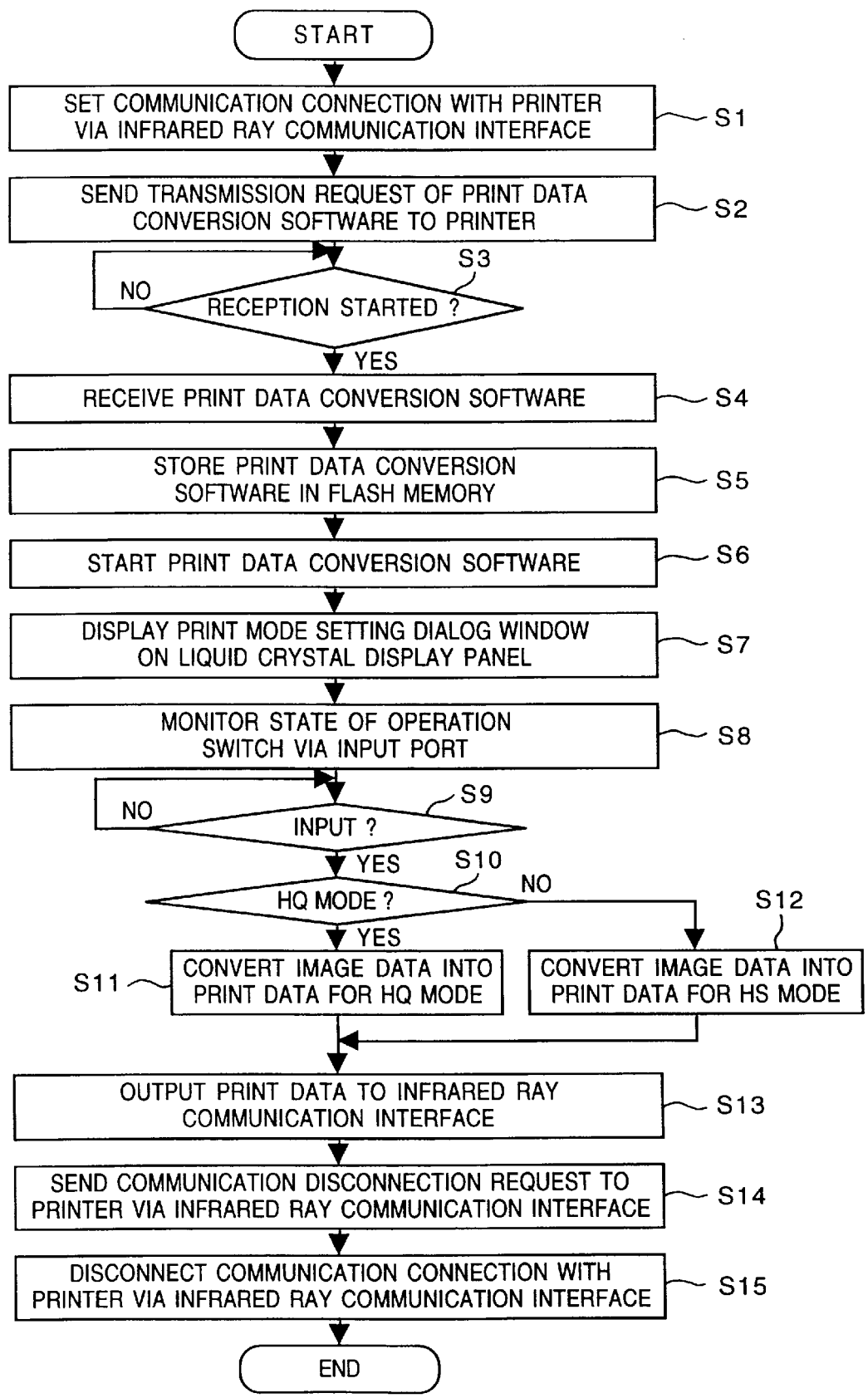
FIG. 5 is a flow chart showing the basic operation of the digital camera 10.

FIG. 5 is a flow chart showing the basic operation of the digital camera 10. The CPU 20 of the digital camera 10 instructs the IrDA communication control circuit 42 in the infrared ray communication interface 16 to start communications with the infrared ray communication interface 18 of the printer 12. The communications are made based on a communication protocol defined by IrDA. The IrDa infrared ray communications are half-duplex communications using infrared rays and can communicate data in two ways. A communication connection is set between the infrared ray communication interface 16 of the digital camera 10 and the infrared ray communication interface 18 of the printer 12 (S1). Using the set communication connection, the digital camera 10 and printer 12 can perform two-way communications.

The CPU 20 requests the printer 12 transmission of print data conversion software (S2), and stands by to receive the print data conversion software (S3). The print data conversion software to be executed by the CPU 20 of the digital camera 10 converts image data stored in the flash memory 26 of the digital camera 10 into a data format that the printer 12 can print (i.e., print data). The data conversion software has programs associated with various kinds of mode setting and a user interface for setting a mode upon printing print data.

The CPU 20 starts reception of the print data conversion software (S3), and upon completion of reception (S4), it stores the received data conversion software in the flash memory 26 (S5). The CPU 20 then starts the data conversion software stored in the flash memory 26 (S6).

Figure 7:
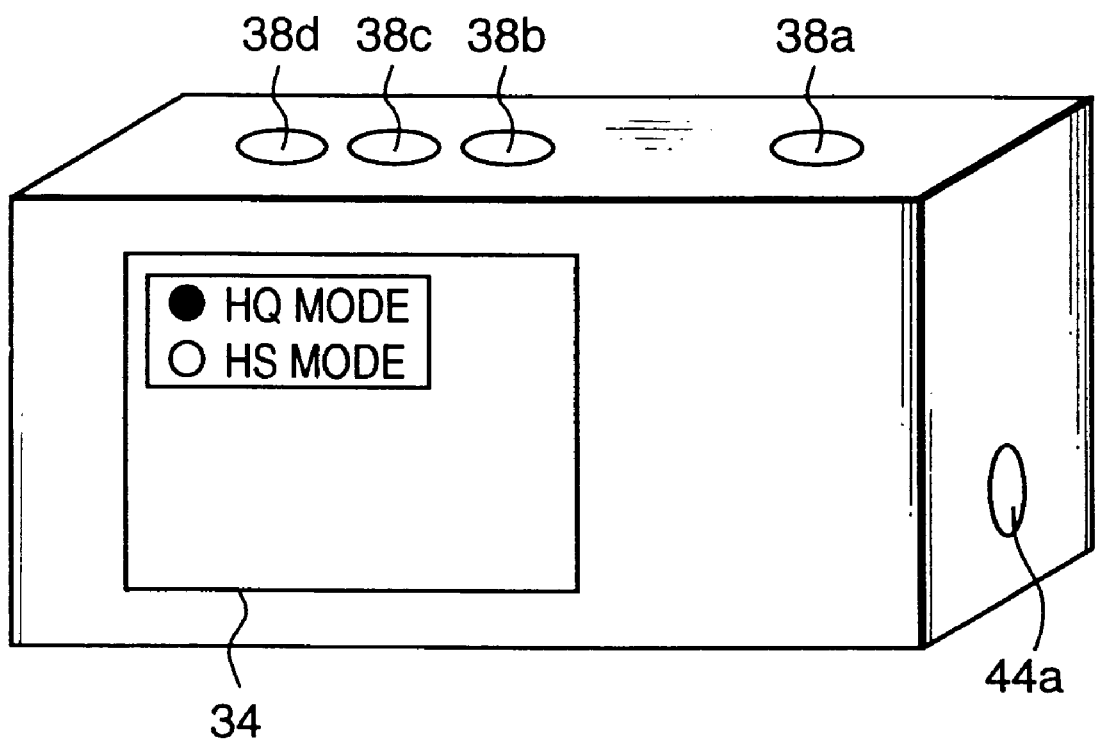
FIG. 7 is a perspective view showing the print mode selection window.

The started data conversion software sends data of a print mode setting dialog window to the display control circuit 36 to display the print mode setting dialog window on the liquid crystal display panel 34 (S7). FIG. 7 shows the print mode setting dialog window. In FIG. 7, the dialog window for selecting one of HQ and HS modes is displayed. The HQ mode instructs high-quality (low-speed) printing, and the HS mode instructs high-speed (low-quality) printing.

At this time, the CPU 20 monitors the operation states of the operation switches 38b, 38c, and 38d (S8) and waits for a user's input (S9). If the user selects the HQ mode (S10), the CPU 20 converts the image data stored in the flash memory 26 into print data corresponding to the HQ mode (S11); otherwise, the CPU 20 converts the image data stored in the flash memory 26 into print data corresponding to the HS mode (S12). In either case, the obtained print data is temporarily stored in the flash memory 26 or RAM 24.

The digital camera 10 transmits the print data obtained in step S11 or S12 to the printer 12 set with the communication connection via the infrared ray communication interface 16 (S13). More specifically, the print data temporarily stored in the flash memory 26 or RAM 24 is transferred to the IrDA communication control circuit 42 via the internal bus 46. The IrDA communication control circuit 42 modulates the input print data to be suitable for communications, and supplies the modulated data to the infrared ray transceiver 44. The infrared ray transceiver 44 outputs the received data as an infrared ray signal.

Upon completion of transmission of the print data, the CPU 20 transmits a disconnection request of the communication connection between the digital camera 10 and printer 12 to the printer 12 (S14) to disconnect the communication connection with the printer 12 (S15).

Figure 6:
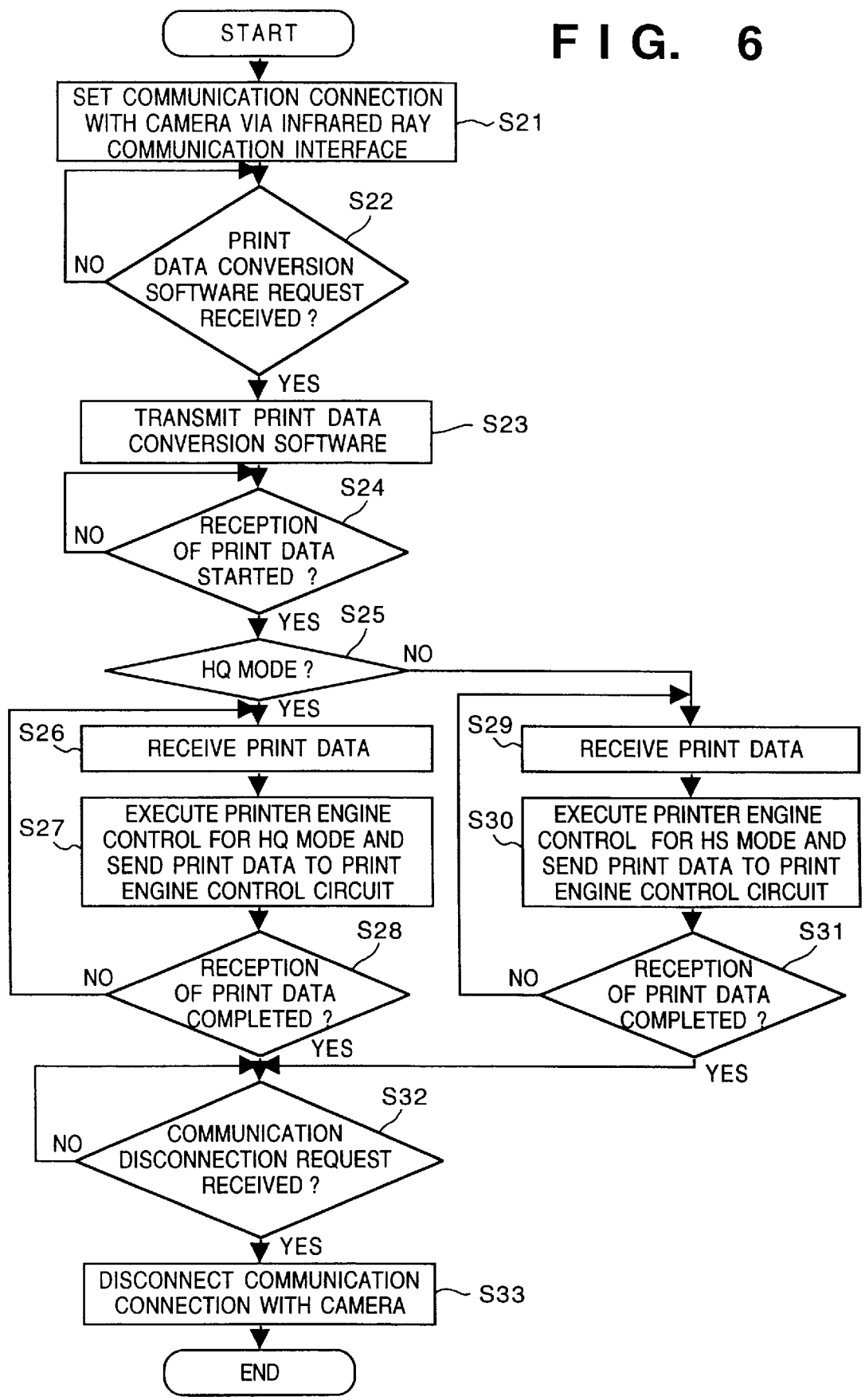
FIG. 6 is a flow chart showing the basic operation of the printer 12.

FIG. 6 is a flow chart showing the basic operation of the printer 12. The operation of the printer 12 will be described below with reference to FIG. 6. The CPU 50 sets a communication connection with the digital camera 10 using the IrDA communication control circuit 56 of the infrared ray communication interface 18 (S21). The CPU 50 waits for receipt of a print data conversion software request from the digital camera 10 (S22). Upon reception of the request, the CPU 50 sends the print data conversion software to the digital camera 10 (S23). More specifically, the CPU 50 reads out the print data conversion software stored in the ROM 52 or the like, and transfers it to the IrDA communication control circuit 56 via the internal bus 68. The IrDA communication control circuit 56 modulates the input print data conversion software to be suitable for communications, and supplies it to the infrared ray transceiver 58. The infrared ray transceiver 58 converts the signal received from the IrDA communication control circuit 56 into an infrared ray signal, and transmits the converted signal to the digital camera 10.

Upon completion of transmission of the print data conversion software, the CPU 50 waits for reception of print data (S24). If print data reception is started (S24), the CPU 50 checks if the received print data corresponds to the HQ mode (S25).

If the print data corresponds to the HQ mode (S25), the CPU 50 instructs the printer engine control circuit 64 to process the received print data in the HQ mode, so as to output an image expressed by the print data from the printer engine 66 to have high quality (S26, S27, S28).

If the print data does not correspond to the HQ mode (S25), the CPU 50 directs the printer engine control circuit 64 to process the received print data in the HS mode so as to output an image expressed by the print data from the printer engine 66 at high speed (S29, S30, S31).

Upon completion of reception of the print data (S28, S31), the printer 12 waits for a disconnection request of the infrared ray communications from the digital camera 10 (S32). Upon receiving a disconnection request of the infrared ray communication connection (S32), the printer 12 disconnects the communication connection with the digital camera 10 (S33).

In this manner, by making infrared ray communications between the digital camera 10 and printer 12, the digital camera 10 can directly transmit image data to the printer 12 to print it out.

Figure 8:
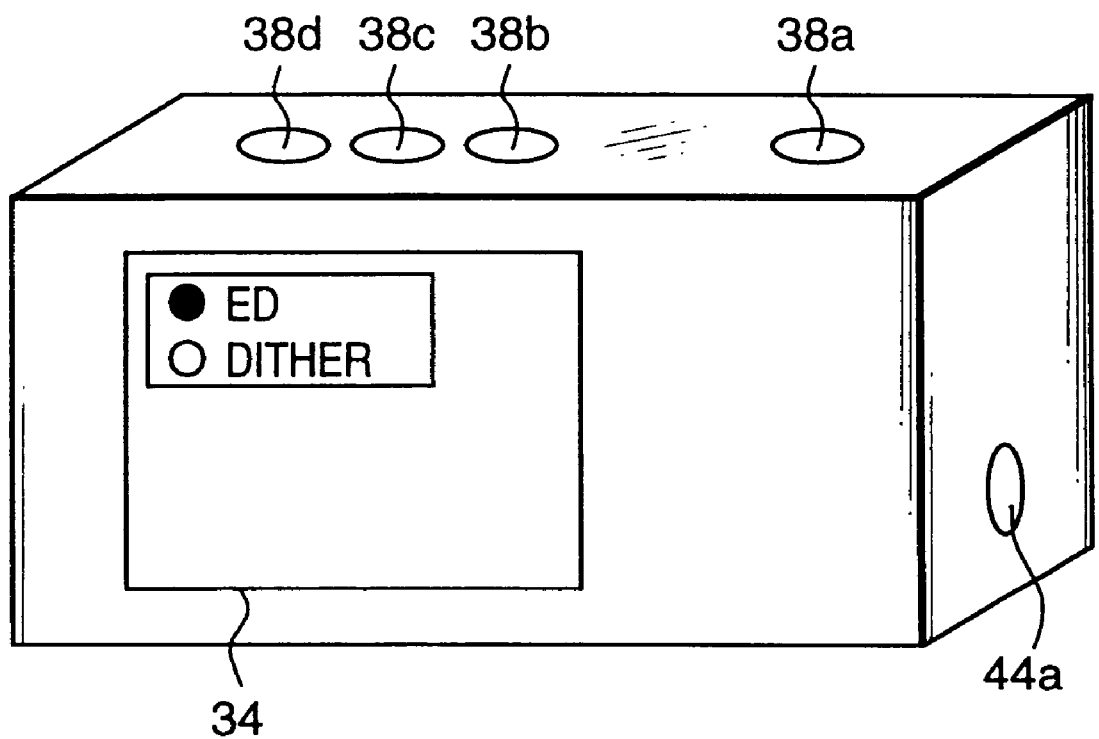
FIG. 8 is a perspective view showing the print mode selection window of the pseudo halftone processing method.

In this embodiment, the HQ and HS modes can be selected as the print mode. However, the present invention is not limited to these two modes. An ink-jet printer must execute pseudo halftone processing upon printing image data. The pseudo halftone processing includes some methods such as ED (error diffusion), dither, and the like. In this case, the pseudo halftone processing modes may be selected using the same dialog window as the selection dialog window for the HQ and HS modes. FIG. 8 shows the selection window of the pseudo halftone processing methods.

Furthermore, color matching modes may be set. Upon setting various conditions, a dialog window for setting such conditions may be displayed on the liquid crystal display panel 34, and may allow the user to set desired conditions using the switches 38b, 38c, and 38d.

Figure 9A:
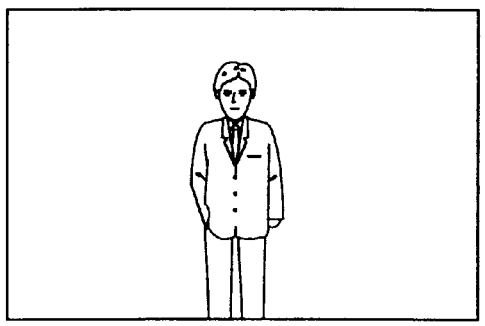
FIGS. 9A to 9D are views showing the correspondence between the zoom-displayed image and print result.
Figure 9B:
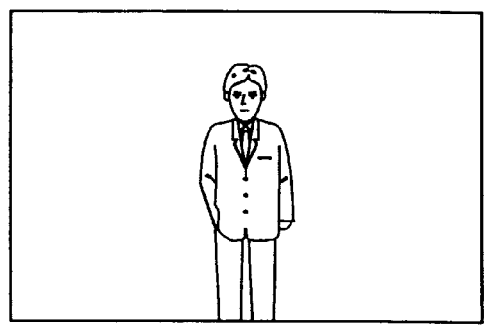
Figure 9C:
Figure 9D:
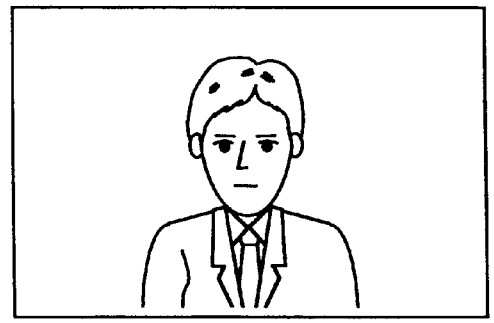

Processing for printing an image zoom-displayed on the liquid crystal display panel 34 in the zoomed size will be explained below. FIGS. 9A to 9D show the correspondence between the zoom-displayed image and its printout result. Note that FIGS. 9A to 9D illustrate as if the size of the image displayed on the liquid crystal display panel were the same as that of the printed image, but they do not always match. However, the range of the displayed image roughly matches that of the printed image. Assuming that FIG. 9A shows an image displayed on the liquid crystal display panel 34 of the digital camera 10, when that image is printed, an image shown in FIG. 9B is obtained. In this embodiment, when the image shown in FIG. 9A is zoom-displayed, as shown in FIG. 9C, the zoom-displayed image can be printed, as shown in FIG. 9D.

FIG. 10 is a flow chart showing the operation for printing out the zoom-displayed image in the zoom state. Steps S41 to S46 respectively correspond to steps S1 to S6 in FIG. 5, and a detailed description thereof will be omitted since the same processing is done. After the print data conversion software is started (S46), the designated image is read out from the flash memory 26 to the image memory 32, and is displayed on the liquid crystal display panel 34 under the control of the display control circuit 36 (S47).

The CPU 20 monitors the operation states of the operation switches 38 (S48, S49) to check if the user's operation selects a zoom display mode (S50). If the user's operation selects the zoom display mode (S50), the CPU 20 instructs the display control circuit 36 to display the image stored in the image memory 32 on the liquid crystal display panel 34 in an enlarged scale (S51). The CPU 20 then converts the image displayed on the liquid crystal display panel 34 into one having a size corresponding to the zoom ratio (S52), and stores the size-converted image data in the flash memory 26 (S53). If the zoom display mode is not selected (S50), the CPU 20 stores the image data stored in the image memory 32 in the flash memory 26 (S54). In either case, the CPU 20 converts the image data stored in the flash memory 26 into print data (S55).

Since the subsequent processing (S56 to S58) corresponds to that in steps S13 to S15 in FIG. 5 and the same processing is done, a detailed description thereof will be omitted.

In this manner, the image zoom-displayed on the liquid crystal display panel 34 can be printed from the printer 12.

Figure 11:
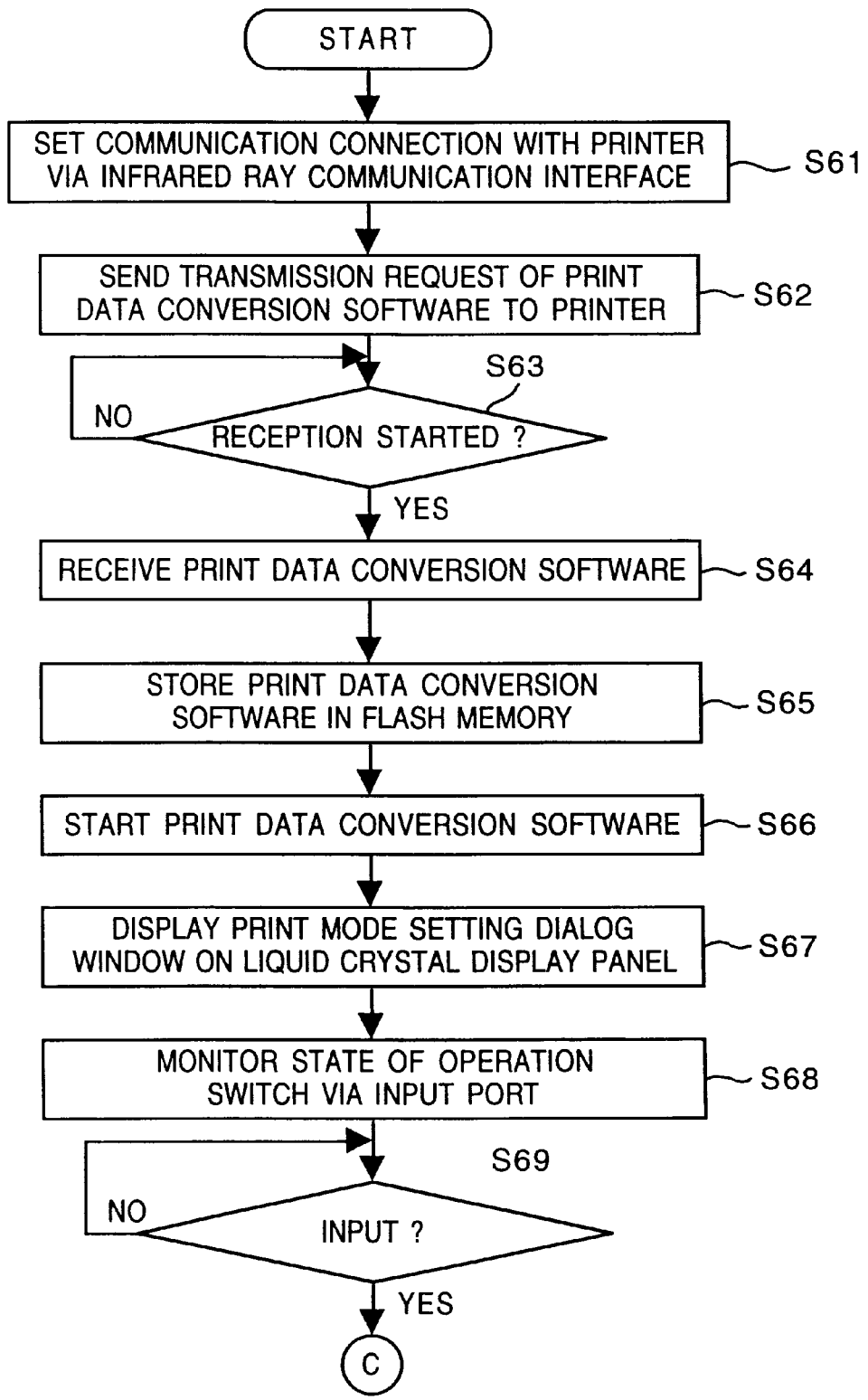
FIG. 11 is a flow chart showing the operation for printing an image in correspondence with a paper sheet set on the printer 12.
Figure 12:
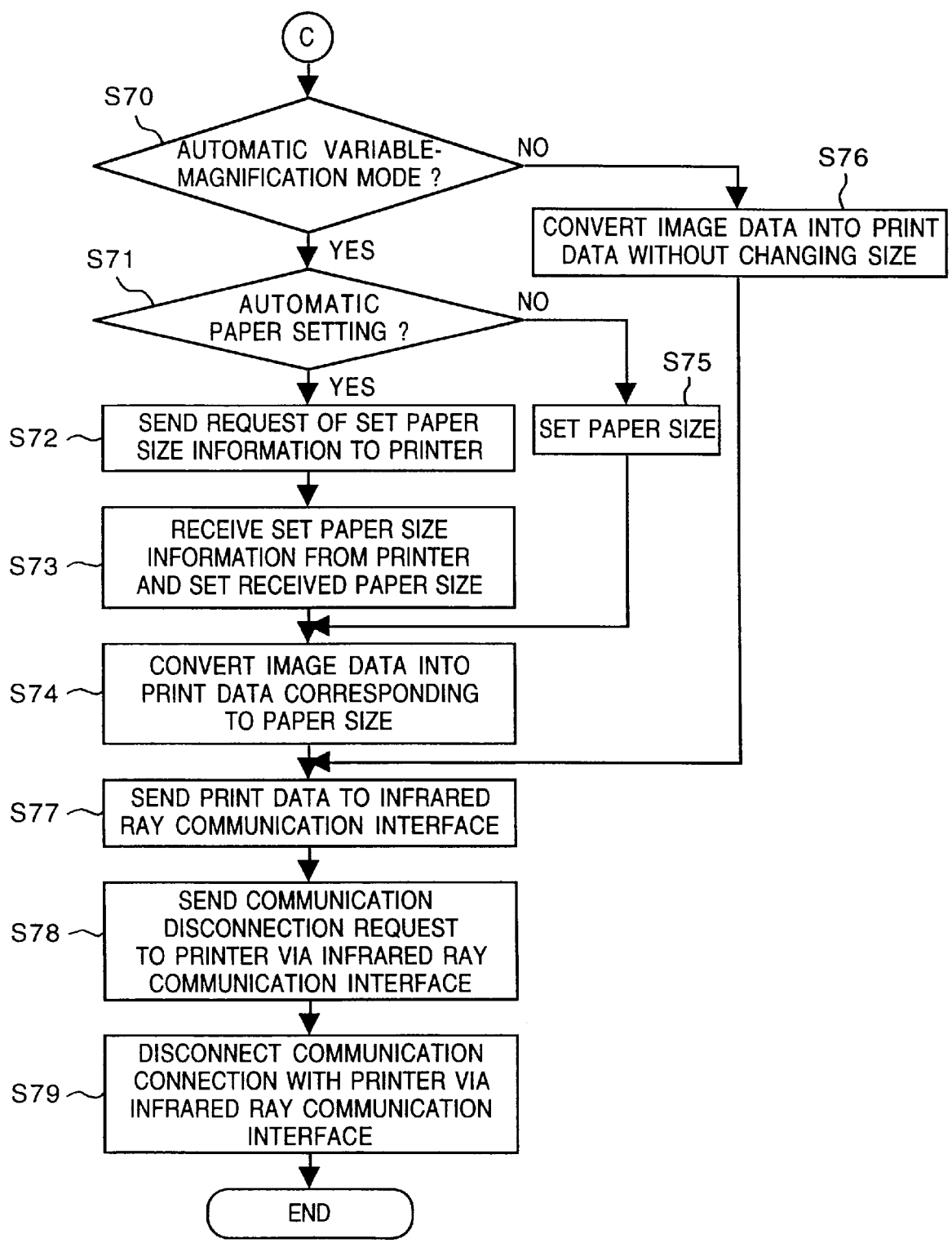
FIG. 12 is a flow chart showing the operation for printing an image in correspondence with a paper sheet set on the printer 12.

In this embodiment, an image can also be size-converted in correspondence with the size of a paper sheet set on the printer 12, and the size-converted image can be printed. FIGS. 11 and 12 are flow charts showing the operation for printing an image in correspondence with the size of the paper sheet set on the printer 12.

Since steps S61 to S66 correspond to steps S1 to S6 in FIG. 5 and the same processing is done, a detailed description thereof will be omitted. After the print data conversion software is started (S66), a print mode setting dialog window is displayed on the liquid crystal display panel 34 (S67).

Figure 13:
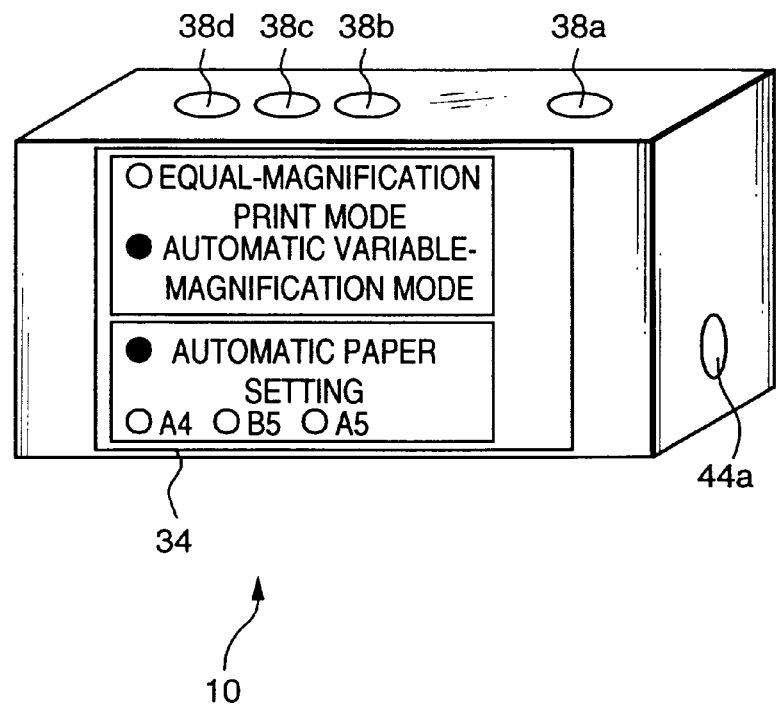
FIG. 13 is a perspective view showing the window for selecting a desired print size.

FIG. 13 shows the paper size selection window. The user can manually select a desired paper size (A4, B5, and A5 in FIG. 13). Also, the user can select one of an equal-magnification print mode for printing an image independently of the paper size, and an automatic variable-magnification mode for automatically converting the size of an image in correspondence with the paper size and printing the size-converted image. Furthermore, in the automatic variable-magnification mode, automatic paper setting can be done. That is, the size of a paper sheet set on the printer 12 (if a plurality of paper sizes are available, the paper size normally used) is automatically detected, and the size of the image is automatically converted in correspondence with the detected paper size to print out the size-converted image.

The CPU 20 waits for a user's switch input in step S69 in FIG. 11, and if an input is detected, the CPU 20 checks if the input selects the automatic variable-magnification mode (S70). If the automatic variable-magnification mode is not selected, the CPU 20 converts image data into print data (S76).

If the automatic variable-magnification mode is selected (S70), the CPU 20 checks if automatic paper setting is to be done (S71). If one of the paper sizes (A4, B5, and A4 in FIG. 13) displayed on the liquid crystal display panel 34 is selected (S71), the CPU 20 sets the selected paper size (S75), and converts the image to be printed into print data whose size is converted in correspondence with the set paper size (S74).

If automatic paper setting is to be done (S71), the CPU 20 requests the printer 12 information of the size of a paper sheet set on the printer 12 (S72). The CPU 50 of the printer 12 transmits the size information of the paper sheet set on the printer 12 to the digital camera 10 in accordance with the received request. The CPU 20 sets the paper size based on the information from the printer 12 (S73), and converts the image to be printed into print data whose size is converted in correspondence with the set paper size (S74).

Since steps S77 to S79 after step S74 or S76 correspond to steps S13 to S15 in FIG. 5 and the same processing is done, a detailed description thereof will be omitted.

With the above-mentioned operations, an image can be printed in the image size corresponding to the size of a paper sheet set on the printer 12.

In the above-mentioned embodiment, since the printer 12 transfers the print data conversion software to the digital camera 10, various kinds of printers 12 can be used. When the printer 12 used has a novel function, the user can immediately make use of that novel function. Of course, print data conversion software may be pre-installed on the digital camera 10. In this case, the print data conversion software may be stored in the ROM 22 in place of the flash memory 26.

Figure 14:
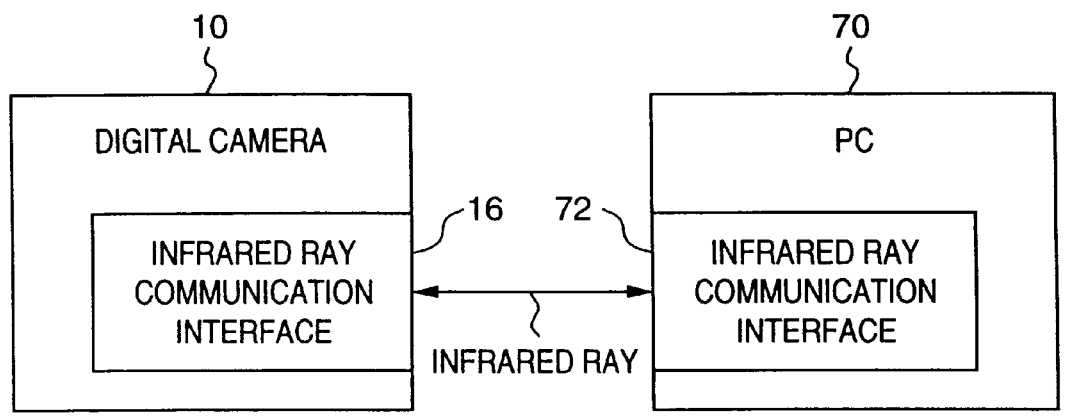
FIG. 14 is a block diagram showing the arrangement for connecting the digital camera 10 and a computer 70 via infrared ray communications.
Figure 15:
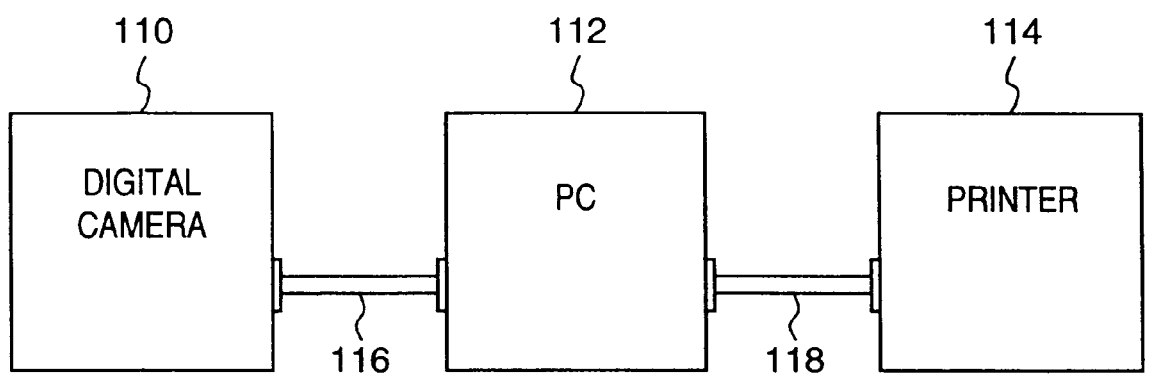
FIG. 15 is a diagram showing the arrangement of an image processing system.

Furthermore, the print data conversion software may be transferred from a computer 70 in place of the printer 12, as shown in FIG. 14. The computer 70 comprises an infrared ray interface 72 similar to the infrared ray communication interface 18 of the printer 12.

The digital camera 10 requests the computer 70 transmission of the print data conversion software as in the printer 12. The computer 70 transmits the print data conversion software to the digital camera 10 on the basis of this request, and the digital camera 10 stores the received print data conversion software in the flash memory 26 or the like. Conversely, the computer 70 may request the digital camera 10 reception of the print data conversion software, and may transmit the print data conversion software to the digital camera 10.

The IrDA scheme has been exemplified as the infrared ray communication scheme among the digital camera 10, printer 12, and computer 70. Instead, ASK (amplitude shift keying) may be used. Furthermore, in place of the infrared ray communication scheme, a radio communication scheme may be used. The radio communication scheme includes a time-division digital communication scheme, spread spectrum scheme, and the like, and any scheme may be used.

On the other hand, when a wired communication scheme is used, a USB (Universal Serial Bus), IEEE1394, and the like can be used.

The digital camera 10 may be either a digital still camera or a digital video camera having a still mode. Since it is not indispensable to print the sensed image in real time, the digital camera 10 may be an image reproduction device that can reproduce an image recorded on a recording medium and can output it as digital data.

SECOND EMBODIMENT

Figure 16:
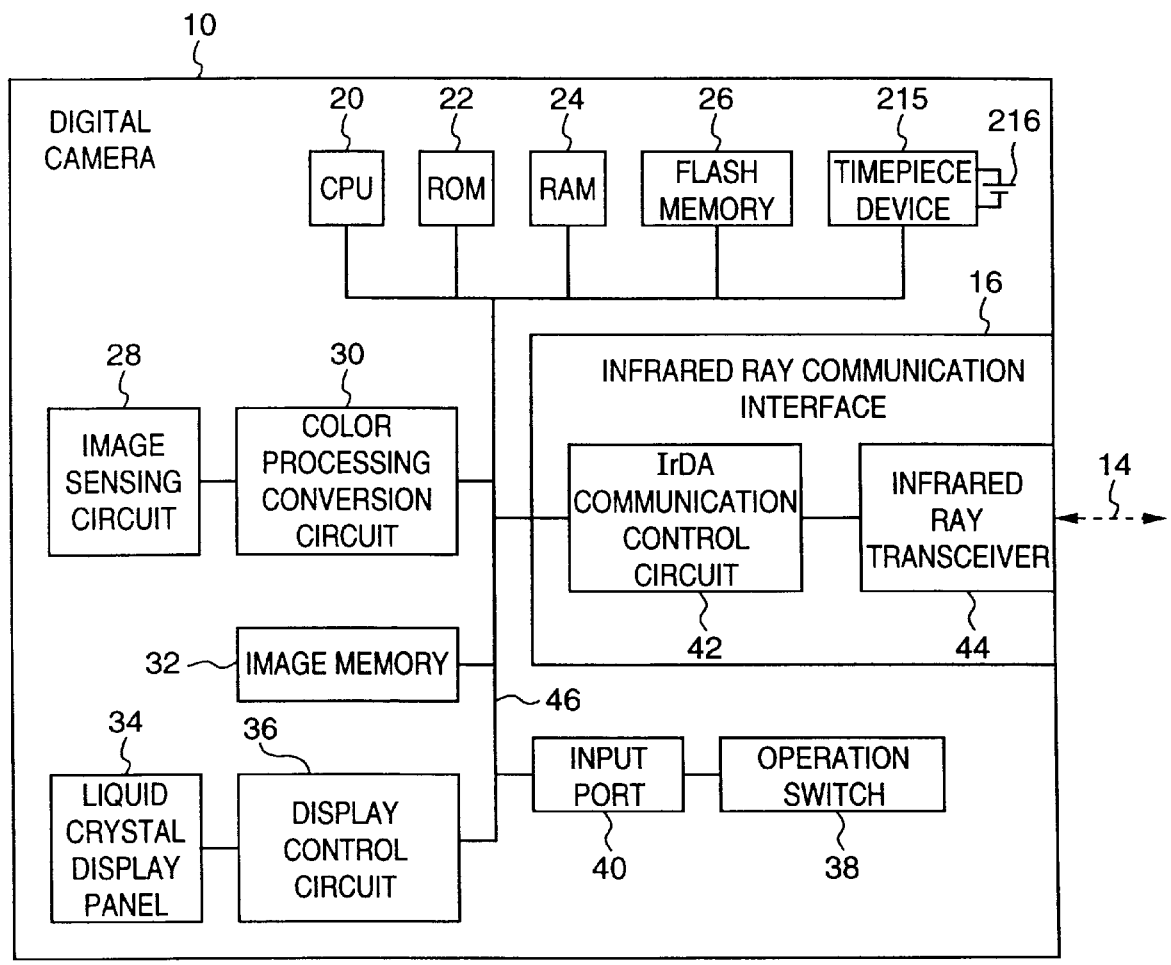
FIG. 16 is a block diagram showing the arrangement of a digital camera 10.
Figure 17:
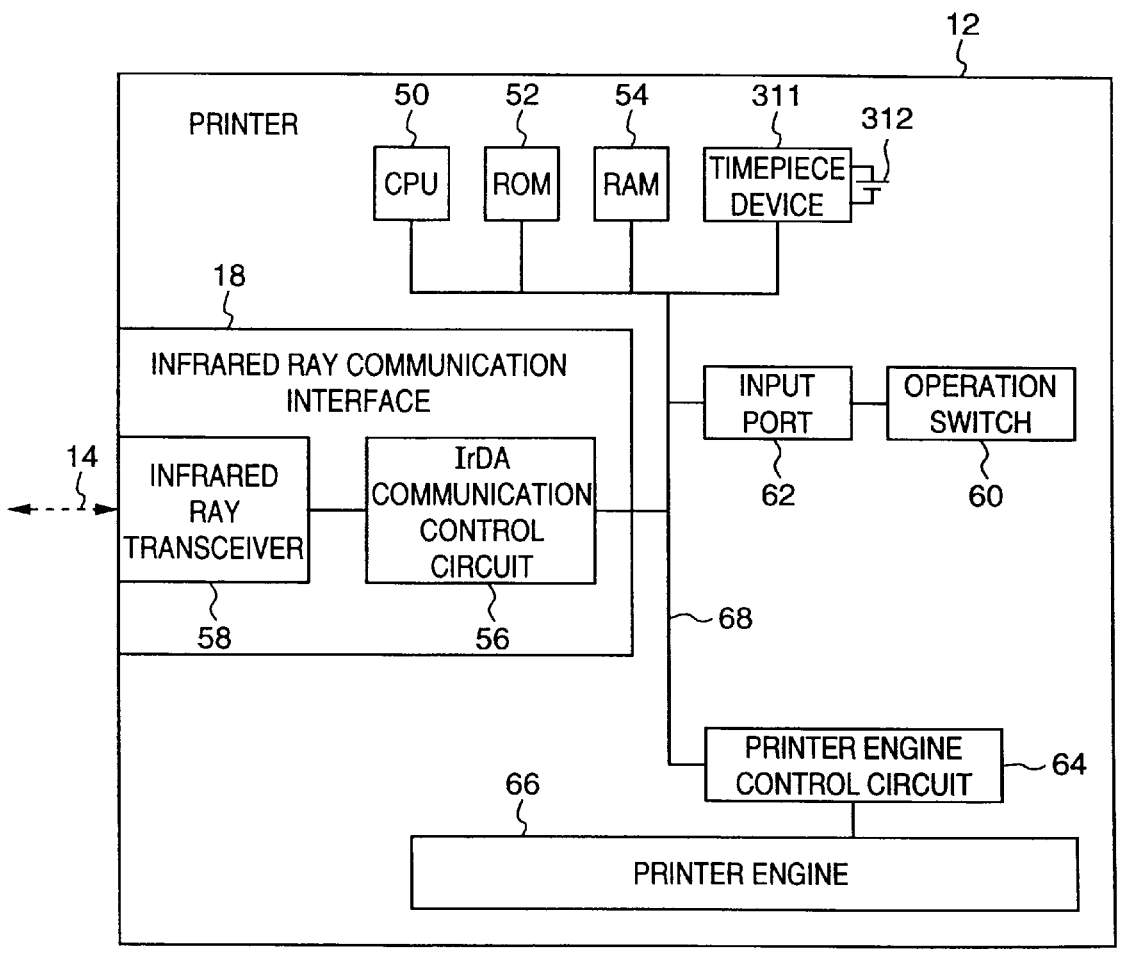
FIG. 17 is a block diagram showing the arrangement of a printer 12.
Figure 18:
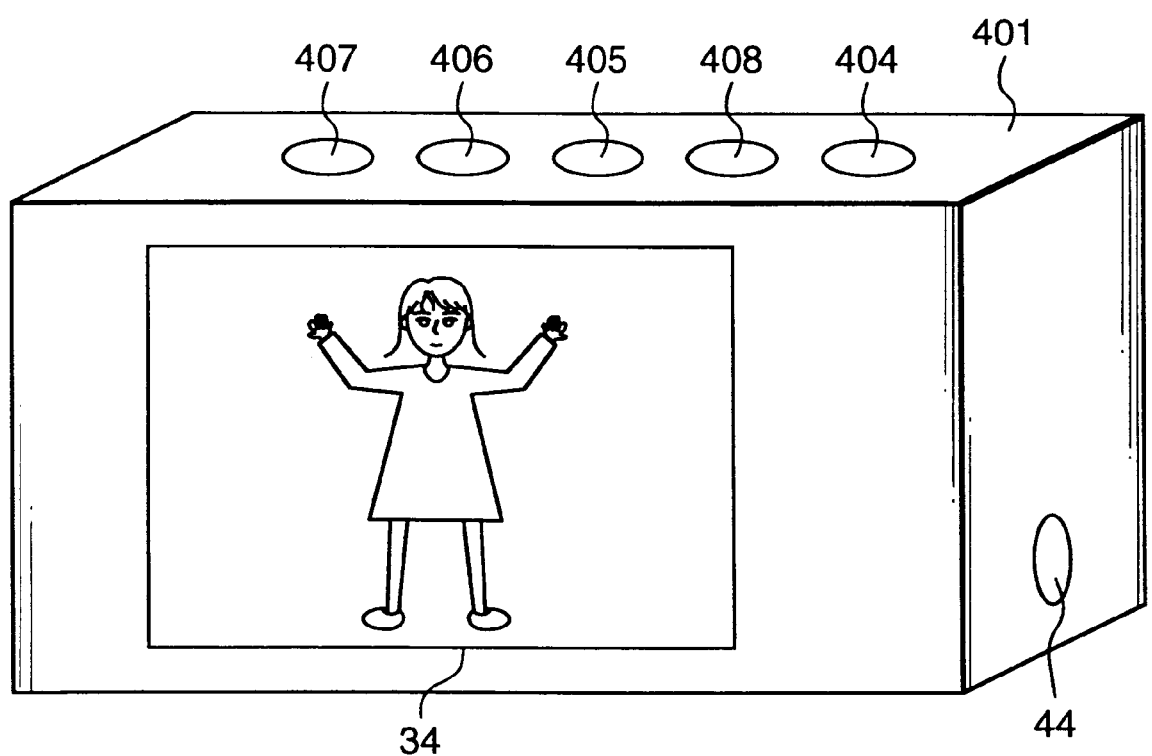
FIG. 18 is a perspective view showing the outer appearance of the digital camera 10 on its back side.

The second embodiment will be described below with reference to FIGS. 16 to 18. FIG. 16 is a block diagram showing the arrangement of a digital camera 10. FIG. 17 is a block diagram showing the arrangement of a printer 12. FIG. 18 is a perspective view showing the outer appearance of the digital camera 10 on its back side.

As shown in FIG. 16, the digital camera 10 has an image sensing circuit 28 for sensing an image and generating an image signal of the sensed image. The image signal generated by the image sensing circuit 28 is output to a color processing conversion circuit 30. The color processing conversion circuit 30 converts the image signal into image data by color conversion processing, and temporarily stores the converted image data in an image memory 32. The image data stored in the image memory 32 is output to a display control circuit 36 or a flash memory 26 via an internal bus 46.

The display control circuit 36 controls a liquid crystal display panel 34 to display image data input from the image memory 32 or data processed by the CPU 20. The liquid crystal display panel 34 serves as a finder, monitor, and the like. Also, the liquid crystal display panel 34 displays data such as various kinds of setting information, e.g., an image sensing mode, time information, and the like. The time information is acquired from a timepiece device 215. The timepiece device 215 has a calendar function, and is backed up by a secondary battery 216 to be able to continue its timepiece operation while the power switch of the digital camera 10 is OFF.

The flash memory 26 stores image data input from the image memory 32, and transfers the stored image data to an infrared ray communication interface 16 via the internal bus 46.

The infrared ray communication interface 16 comprises an IrDA communication control circuit 42 connected to the internal bus 46, and an infrared ray transceiver 44. The IrDA communication control circuit 42 executes modulation/demodulation and serial communication control based on IrDA (Infrared Data Association) as one of infrared ray communication schemes, and exchanges an electrical signal with the infrared ray transceiver 44 in accordance with this communication control. The infrared ray transceiver 44 converts an electrical signal output from the IrDA communication control circuit 42 into a corresponding infrared ray signal, and transmits the converted infrared ray signal as infrared rays 14. Also, the transceiver 44 receives infrared rays 14 and converts them into an electrical signal, and outputs the converted electrical signal to the IrDA communication control circuit 42. The IrDA scheme is half-duplex communication using infrared rays, and can communicate data in two ways.

The above-mentioned blocks are connected to the CPU 20 via the internal bus 46. The CPU 20 controls the above-mentioned blocks by reading out a control program stored in a ROM 22 and executing the readout program. A RAM 24 is used as a temporary storage area of data and work area for arithmetic processing upon executing the control by the CPU 20. The control program includes a system program that describes the control of the overall digital camera 10, and a plurality of individual programs that describe control of an image sensing mode, and the like, and each program is read out and executed in correspondence with the operation states of operation switches 38. The ROM 22 pre-stores print data conversion software in addition to the above-mentioned control program. The print data conversion software is read out from the ROM 22 in accordance with a request from the printer 12, and is transmitted to the printer 12.

The operation switches 38 include various switches such as a shutter switch, mode selection switch, power switch, image data selection switch, and the like, as will be described later. The operation states of the individual switches included in the operation switches 38 are output to the CPU 20 via an input port 40.

In this digital camera 10, as shown in FIG. 18, a shutter switch 404, mode selection switch 405, image selection switch 406, power switch 407, print switch 408, and the like included in the switches 38 are disposed on the upper surface of a body 401. The shutter switch 404 instructs the image sensing timing of the image sensing circuit 28. The mode selection switch 405 is used for selecting one of the image sensing mode and reproduction mode. The image selection switch 406 is used for selecting the image to be displayed on the liquid crystal display panel 34 from those stored in the flash memory 26 in the reproduction mode. The power switch 407 is used for turning on/off the power supply. The print switch 408 instructs transmission of the image to be printed to the printer 12. A transmission/reception window 44 for transmitting an infrared ray signal from the infrared ray transceiver 44 and receiving an infrared ray signal from the printer 12 is formed on the side surface of the body 401. A filter is fitted in this window 44. Furthermore, the liquid crystal display panel 34 is disposed on the back surface of the body 401 to expose its screen 34 externally.

As shown in FIG. 17, the printer 12 has an infrared ray communication interface 18, which comprises an IrDA communication control circuit 56 connected to an internal bus 68 and an infrared ray transceiver 58, as in the infrared ray communication interface 16 of the digital camera 10. The IrDA communication control circuit 56 executes modulation/demodulation and serial communication control based on IrDA, and exchanges an electrical signal with the infrared ray transceiver 58 in accordance with this communication control. The infrared ray transceiver 58 converts an electrical signal received from the IrDA communication control circuit 56 into a corresponding infrared ray signal, and transmits it as infrared rays 14. Also, the transceiver 58 receives and converts infrared rays 14 into an electrical signal, and outputs the converted electrical signal to the IrDA communication control circuit 56.

In the infrared ray communication interface 18, upon receiving the print data conversion software transmitted from the digital camera 10, the print data conversion software is temporarily stored in a RAM 54 via the internal bus 68. Thereafter, the print data conversion software is read out and executed by the CPU 50. Upon executing this software, an environment for converting image data from the digital camera 10 into print data that can be printed is built in the printer 12. Subsequently, the infrared ray communication interface 18 receives image data transmitted from the digital camera 10. The received image data is converted into print data in accordance with the processing of the print data conversion software executed by the CPU 50. The converted print data is transferred to a printer engine control circuit 64 via the internal bus 68.

The printer engine control circuit 64 controls a printer engine 66. The printer engine 66 prints an image corresponding to the print data on a print medium.

The CPU 50 is connected to the above-mentioned blocks via the internal bus 68, executes the above-mentioned print data conversion software, and controls the individual blocks on the basis of a control program stored in a ROM 52. The RAM 54 is used as a temporary storage area of data and work area for arithmetic processing upon executing the control by the CPU 50. The control program includes a system program that describes the control of the overall printer 12, and a plurality of individual programs that describe control of the individual blocks, and each program is read out and executed in correspondence with the operation states of operation switches 60.

The operation switches 60 include a mode selection switch, power switch, paper discharge switch, and the like. The operation states of the switches included in the operation switches 60 are output to the CPU 50 via an input port 62.

The CPU 50 acquires time information from a timepiece device 311 having a calendar function, and manages printer jobs using this time information. The timepiece device 311 is backed up by a secondary battery 312 to be able to continue its timepiece operation while the power switch of the printer 12 is OFF.

Figure 19:
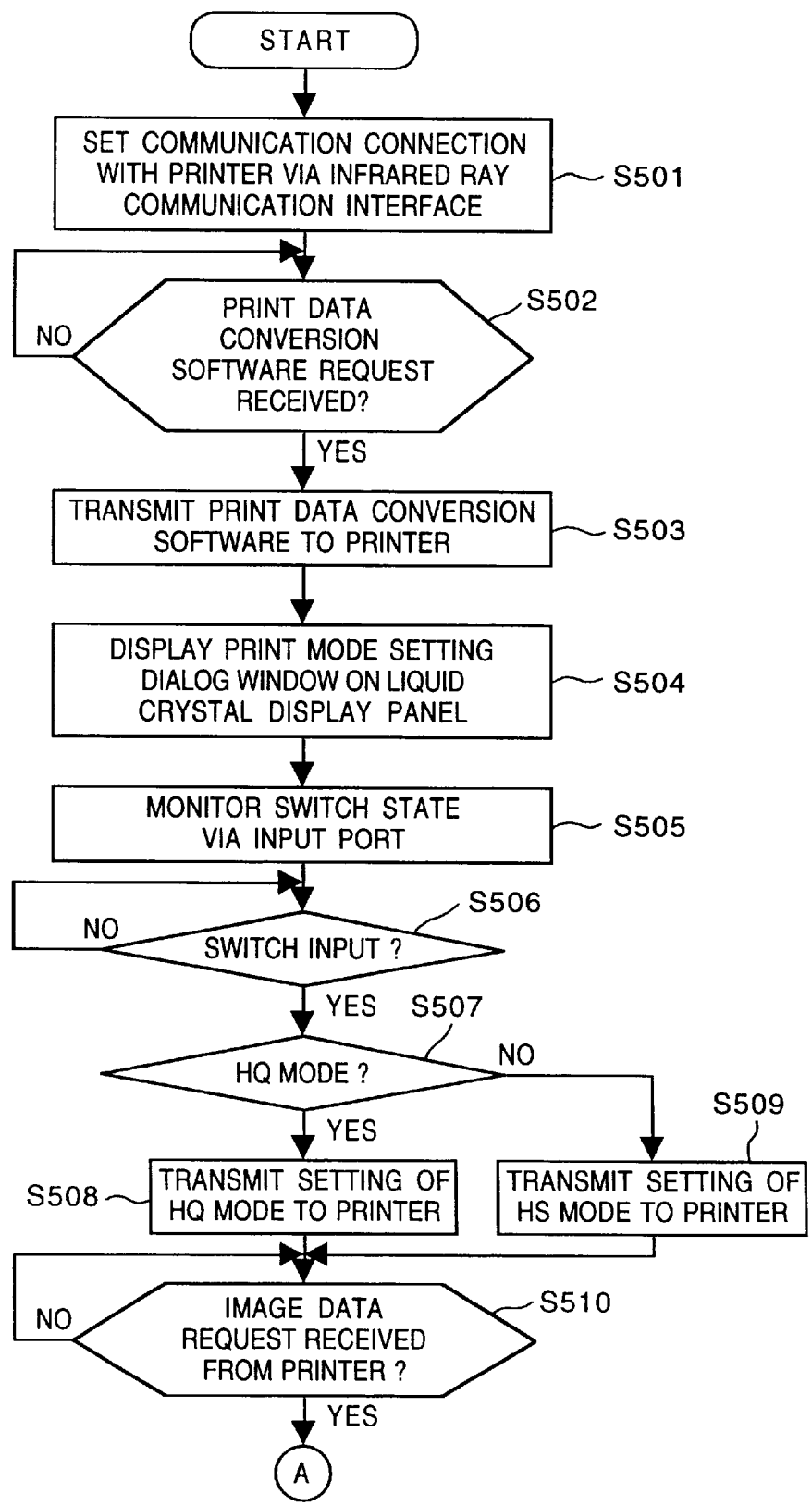
FIG. 19 is a flow chart showing the control operation of the digital camera 10.
Figure 20:
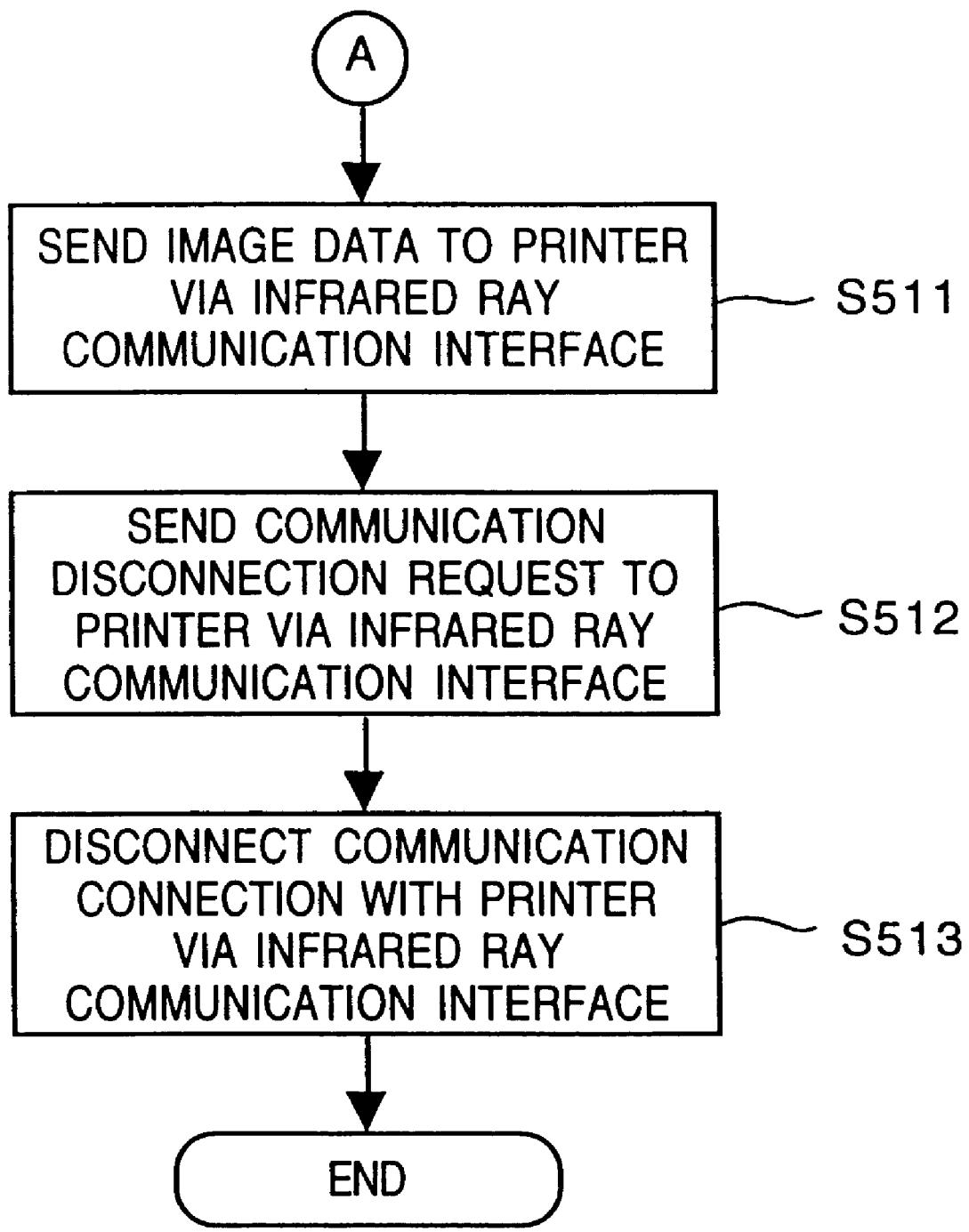
FIG. 20 is a flow chart showing the control operation of the digital camera 10.
Figure 21:
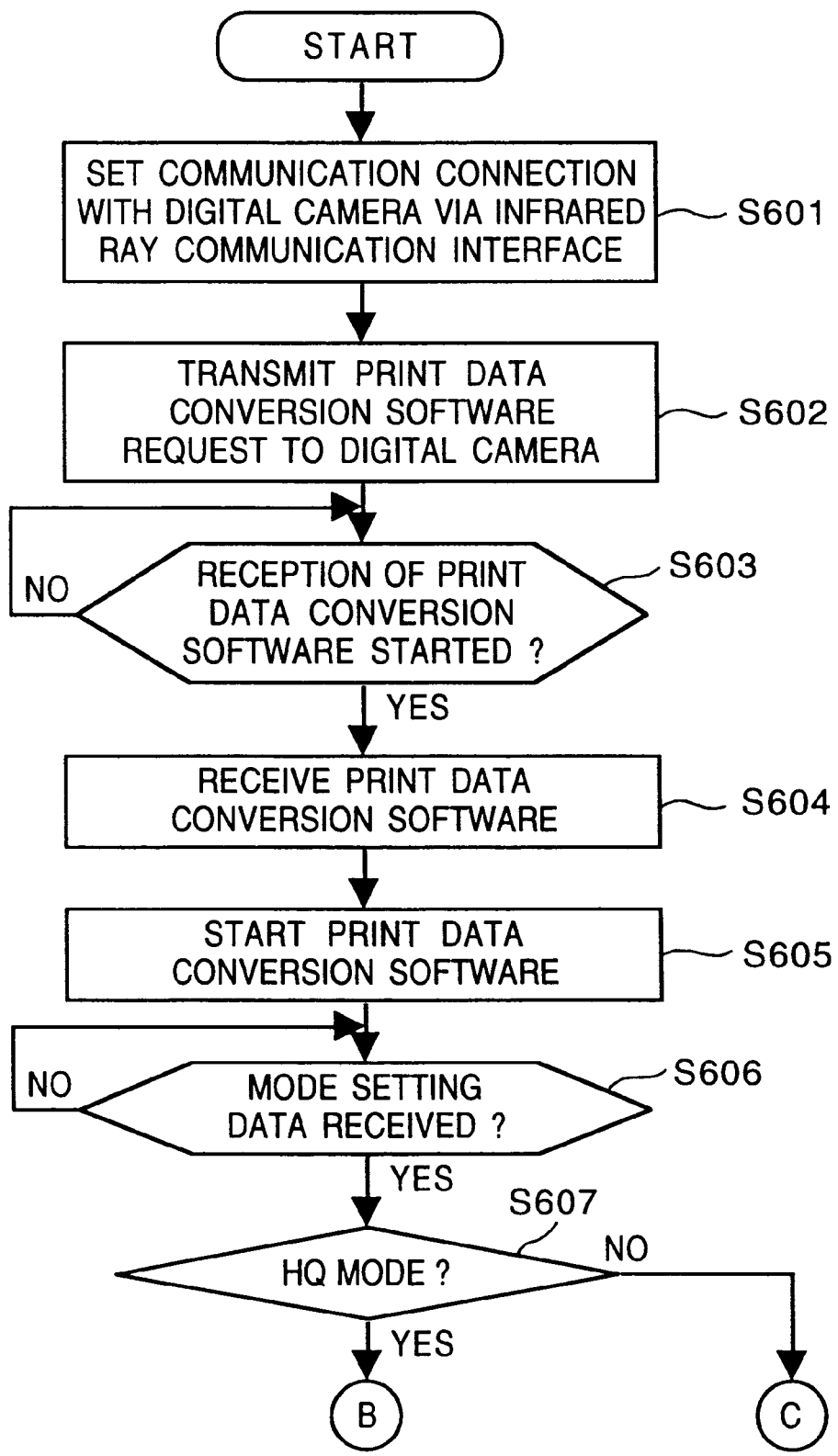
FIG. 21 is a flow chart showing the control operation of the printer 12.
Figure 22:
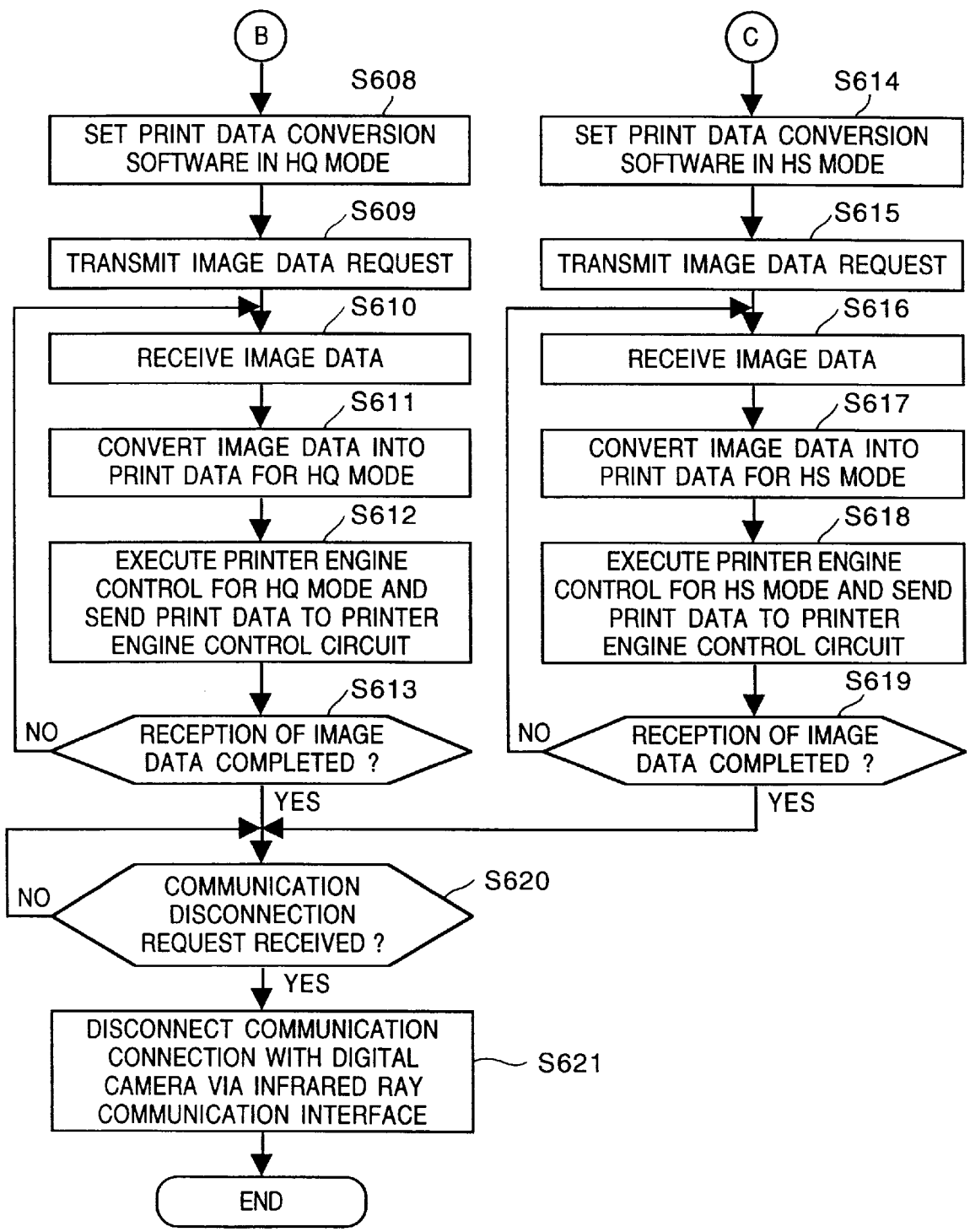
FIG. 22 is a flow chart showing the control operation of the printer 12.
Figure 23:
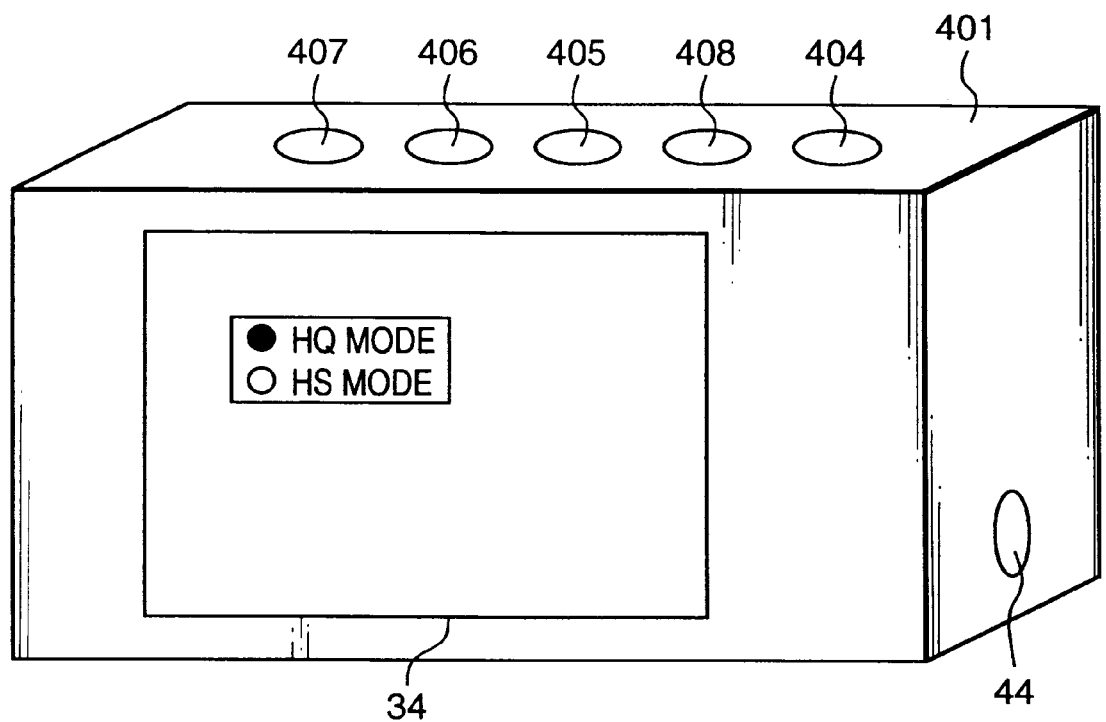
FIG. 23 is a perspective view showing the selection window of print modes on the digital camera 10.
Figure 24:
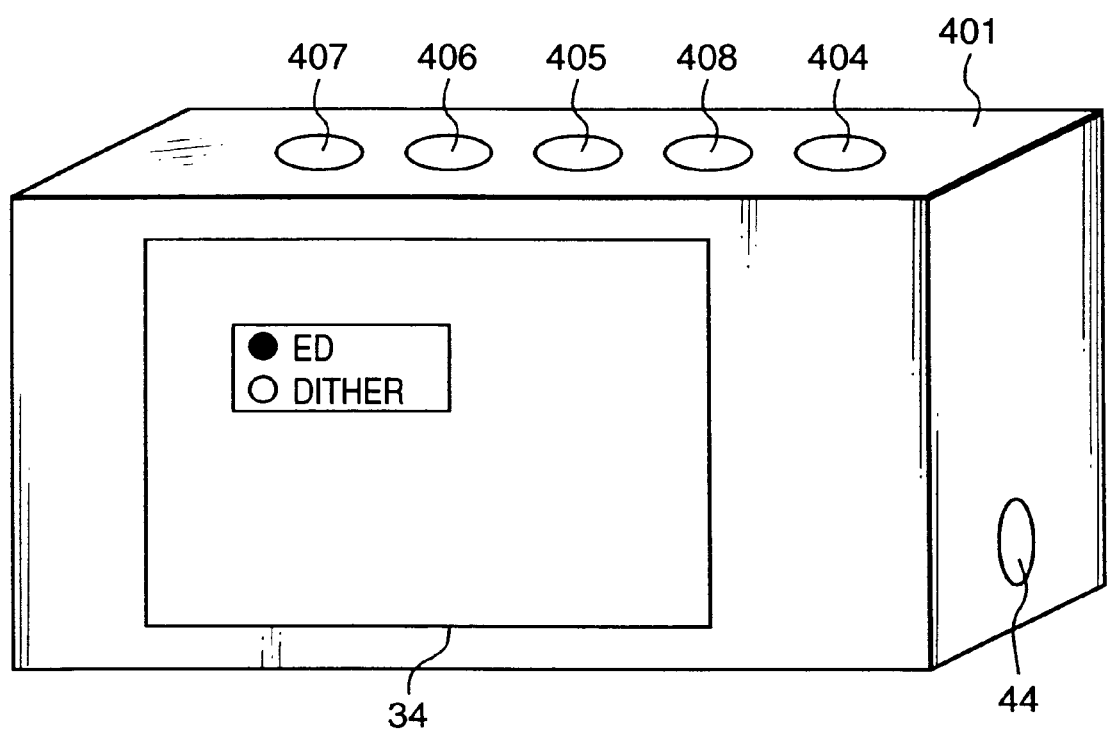
FIG. 24 is a perspective view showing the selection window of other print modes on the digital camera 10.

The operation for printing an image sensed by the digital camera 10 using the printer 12 will be described below with reference to FIGS. 19 to 22. FIGS. 19 and 20 are flow charts showing the control operation of the digital camera 10. FIGS. 21 and 22 are flow charts showing the control operation of the printer 12. FIG. 23 shows the selection window of print modes of the digital camera 10. FIG. 24 shows the selection window of other print modes of the digital camera 10.

When an image sensed by the digital camera 10 is to be printed by the printer 12, the digital camera 10 is controlled by the CPU 20 in accordance with a predetermined sequence. As shown in FIG. 19, in step S501, the CPU 20 detects that the user has pressed the switch 408, instructs the IrDA communication control circuit 42 of the infrared ray communication interface 16 to start communications, and sets a communication connection with the printer 12 via the infrared ray communication interface 16 in accordance with an IrDA communication protocol.

The flow then advances to step S502, and the CPU 20 waits for a transmission request of the print data conversion software from the printer 12. Upon receiving a print data conversion software request from the printer 12, the CPU 20 reads out the print data conversion software from the ROM 22 in response to the print data conversion software transmission request, and transmits it to the printer 12 via the infrared ray communication interface 16 in step S503.

In step S504, the CPU 20 outputs print mode setting dialog window data to the display control circuit 36 and controls the circuit 36 to display the print mode setting dialog window data on the liquid crystal display panel 34. Under such control, the display screen 34 of the liquid crystal display panel 34 displays the selection window of print modes, i.e., HQ and HS mode, as shown in FIG. 23. The HQ mode instructs the printer 12 to print an image with high quality, and the HS mode instructs the printer to print an image at high speed.

The flow then advances to step S505, and the CPU 20 starts monitoring of the operation states of the switches included in the operation switches 38 via the input port 40. Subsequently, in step S506, the CPU 20 monitors if the user presses one of the mode selection switch 405, image data selection switch 406, and print switch 408, which are assigned as selection switches of the print mode after depression of the switch 408. If the user has pressed one of these switches, the CPU 20 checks in step S507 if the mode selected by the pressed switch is the HQ mode. If the HQ mode is selected, the flow advances to step S508 to transmit an HQ mode setting request to the printer 12 via the infrared ray communication interface 16. On the other hand, if the HQ mode is not selected, it is determined that the selected mode is the HS mode, and the flow advances to step S509 to transmit an HS mode setting request to the printer 12 via the infrared ray communication interface 16.

After the setting request of the selected print mode is transmitted, the CPU 20 waits for an image data transmission request from the printer 12 in step S510. Upon receiving an image data transmission request from the printer 12, the flow advances to step S511 shown in FIG. 20.

In step S511, the CPU 20 reads out image data from the flash memory 26, and transmits the readout image data to the printer 12 via the infrared ray communication interface 16. More specifically, the CPU 20 transfers image data stored in the flash memory 26 to the IrDA communication control circuit 42 via the internal bus 46, and the IrDA communication control circuit 42 converts the transferred image data into a modulated signal. Thereafter, the circuit 42 outputs the modulated signal to the infrared ray transceiver 44, which transmits infrared rays 14 corresponding to the modulated signal, thereby transmitting image data to the printer 12.

Upon completion of transmission of the image data, the flow advances to step S512, and the CPU 20 transmits a request for disconnecting communications between the digital camera 10 and printer 12 to the printer 12 via the infrared ray communication interface 16. Finally, in step S513, the CPU 20 executes disconnection processing of the infrared ray communications for disconnecting the communication connection with the printer 12 in accordance with the IrDA communication protocol, thus ending this processing.

On the other hand, the printer 12 is controlled by the CPU 50 in accordance with a predetermined sequence. As shown in FIG. 21, the CPU 50 directs the IrDA communication control circuit 56 of the infrared ray communication interface 18 to start communications upon receiving the start instruction of communications with the digital camera 10, and sets a communication connection with the digital camera 10 via the infrared ray communication interface 18 in accordance with the IrDA communication protocol, in step S601.

The flow advances to step S602, and the CPU 50 transmits a transmission request of the print data conversion software to the digital camera 10 via the infrared ray communication interface 18. In step S603, the CPU 50 waits for the print data conversion software transmitted from the digital camera 10. Upon starting transmission of the print data conversion software from the digital camera 10, the flow advances to step. S604, and the CPU 50 receives the print data conversion software and stores it in the RAM 54.

Upon completion of reception of the print data conversion software, the flow advances to step S605, and the CPU 50 starts the received print data conversion software to build an environment for converting image data transmitted from the digital camera 10 into print data in the printer 12.

The flow then advances to step S606, and the CPU 50 waits for a print mode setting request from the digital camera 10. Upon receiving a print mode setting request, the CPU 50 checks in step S607 if the requested print mode is the HQ mode. If the requested print mode is the HQ mode, the flow advances to step S608 shown in FIG. 22; otherwise, it is determined that the requested print mode is the HS mode, and the flow advances to step S614 shown in FIG. 22.

In step S608, the CPU 50 sets the print mode of the print data conversion software in the HQ mode, as shown in FIG. 22. Upon setting the HQ mode, an environment for converting image data transmitted from the digital camera 10 into print data corresponding to the HQ data is set. Subsequently, in step S609, the CPU 50 sends an image data transmission request to the digital camera 10 via the infrared ray communication interface 18.

In step S610, the CPU 50 receives infrared rays 14 transmitted from the digital camera 10 in response to the image data transmission request. Subsequently, the CPU 50 converts the received image data into print data corresponding to the HQ mode in step S611, and executes printer engine control corresponding to the HQ mode in step S612 to transfer the print data in the HQ mode to the printer engine control circuit 64 via the internal bus 68. The CPU 50 then checks in step S613 if reception of image data is complete. If reception of image data is not complete yet, the flow returns to step S610 above, and the processing from steps S610 to S612 is repeated until reception of image data is complete.

Upon completion of reception of image data, the flow advances to step S620, and the CPU 50 waits for reception of a communication disconnection request from the digital camera 10. Upon receiving a connection disconnection request, the CPU 50 executes processing for disconnecting the communication connection with the digital camera 10 via the infrared ray communication interface 18 in accordance with the IrDA communication protocol in step S621, thus ending this processing.

In step S614, the CPU 50 sets the print mode of the print data conversion software in the HS mode, as shown in FIG. 22. Upon setting the HS mode, an environment for converting image data from the digital camera 10 into print data corresponding to the HS mode is set. Subsequently, in step S615, the CPU 50 transmits an image data transmission request to the digital camera 10 via the infrared ray communication interface 18.

In step S616, the CPU 50 receives infrared rays 14 transmitted from the digital camera 10 in response to the image data transmission request, and extracts image data from the infrared rays. Next, the CPU 50 converts the image data into print data corresponding to the HS mode in step S617, and executes print engine control corresponding to the HS mode in step S618 to transfer the print data in the HS mode to the printer engine control circuit 64 via the internal bus 68. The CPU 50 then checks in step S619 if reception of image data is complete. If reception of image data is not complete yet, the flow returns to step S616, and the processing in steps S616 to S619 is repeated until reception of image data is complete.

Upon completion of image data, the flow advances to step S620, and the CPU 50 waits for reception of a communication disconnection request from the digital camera 10. Upon receiving a connection disconnection request, the CPU 50 executes processing for disconnecting the communication connection with the digital camera 10 via the infrared ray communication interface 18 in accordance with the IrDA communication protocol in step S621, thus ending this processing.

As described above, in the image processing system of the second embodiment, when an image sensed by the digital camera 10 is printed by the printer 12, a communication connection is set between the digital camera 10 and printer 12 by transmitting/receiving infrared rays 14 via their infrared ray communication interfaces 16 and 18. The digital camera 10 transmits the print data conversion software to the printer 12 as infrared rays 14, and the printer 12 starts the print data conversion software. Thereafter, the digital camera 10 transmits image data to the printer 12 as infrared rays 14. The print data conversion software running on the printer 12 converts the image data into print data. In this way, an image sensed by the digital camera 10 can be directly printed by the printer 12 without inserting any personal computer between the digital camera 10 and printer 12, i.e., without requiring any cumbersome operations.

In the second embodiment, one of the HQ and HS modes is selected as the print mode. Alternatively, other modes may be set. When the printer comprises an ink-jet printer, pseudo halftone processing must be done. The pseudo halftone processing includes some methods such as ED (error diffusion), dither, and the like, and some of these pseudo halftone processing methods may be selected. In order to select some pseudo halftone processing methods, a dialog window for selecting one of ED and dither is displayed on the display screen of the liquid crystal display panel 34, as shown in FIG. 24, in the same manner as selection of the print modes, and one of these methods is selected by the switch operation, thus allowing the user to set halftone processing of his or her choice.

In addition to the above setting, other modes for setting, e.g., color matching may be set. A corresponding dialog window is displayed on the liquid crystal display panel 34 in correspondence with the modes to be set, and the user selects a desired mode using the switches, thus easily setting various modes.

Furthermore, in the second embodiment, the print data conversion software is installed on the digital camera 10, and is transmitted to the printer 12 when an image sensed by the digital camera 10 is printed by the printer 12. Alternatively, print data software corresponding to image data of the digital camera 10 may be pre-installed on the printer 12. In place of installing all the components of the print data conversion software in the printer 12, some components are installed in the printer, and the remaining components are installed in the digital camera 10 and are transmitted to the printer 12 when an image sensed by the digital camera 10 is printed by the printer 12. More specifically, only a software portion for decompressing image data compressed in the JPEG format may be transferred from the digital camera 10, and a software portion for converting the decompressed image data into print data may be installed on the printer 12.

Moreover, the second embodiment uses infrared ray communication based on IrDA. In place of IrDA, ASK (amplitude shift keying) may be used. Also, other radio communication schemes using sonic waves, radio waves, and the like may be used, and radio wave schemes such as a time-division digital communication scheme such as PHS, spread spectrum scheme, and the like may be used.

In the second embodiment, the print data conversion software is stored in the RAM 52 in the printer 12. In place of the RAM 52, a storage means such as a hard disk, a memory card, or the like may be arranged, and the print data conversion software may be stored in this storage means.

The second embodiment has exemplified the case wherein an image sensed by the digital camera 10 is printed. Also, the present invention can be applied to a case wherein an image sensed in the still mode of a digital video camera is printed.

THIRD EMBODIMENT

Figure 25:
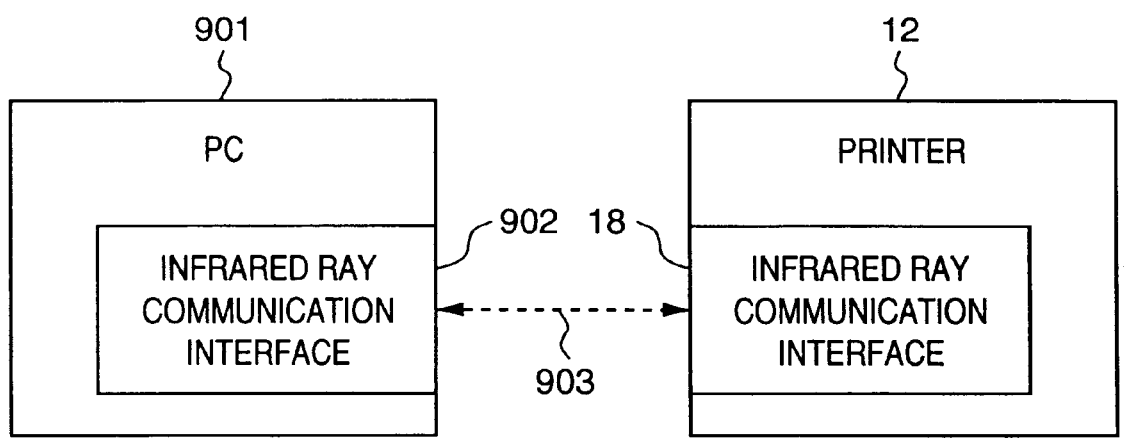
FIG. 25 is a block diagram showing the arrangement of an image processing system.

The third embodiment of the present invention will be described below with reference to FIG. 25. FIG. 25 is a block diagram showing the arrangement of an image processing system.

The third embodiment is different from the above-mentioned second embodiment in that print data conversion software is transmitted from a personal computer to a printer.

The image processing system of the third embodiment comprises a digital camera (not shown) with an IrDA type infrared ray communication interface, and a printer 12 with an IrDA type infrared ray communication interface 18, as shown in FIG. 25. A digital camera 10 and the printer 12 communicate with each other by transmitting/receiving infrared rays via their infrared ray communication interfaces. When an image sensed by the digital camera 10 is printed, image data is transmitted from the digital camera 10 via the infrared ray communication interface, and is received by the printer 12 via the infrared ray communication interface 18. The received image data is converted into print data that can be printed by print data conversion software executed by a CPU 50 of the printer 12, and an image is printed on the basis of the converted print data.

This print data conversion software is installed on a personal computer (to be abbreviated as a PC hereinafter) 901, which transmits the print data conversion software as infrared rays 903 via an infrared ray communication interface 902 in response to a transmission request of the print data conversion software from the printer 12. The printer 12 receives the infrared rays 903 sent from the PC 901 via the infrared ray communication interface 18, and extracts the print data conversion software from the infrared rays 903. The print data conversion software is held in a RAM in the printer 12. The infrared ray communication interface 902 arranged in the PC 901 is based on IrDA, and a communication protocol for transmitting the print data conversion software uses that based on IrDA as in the above-mentioned second embodiment.

The output timing of the transmission request of the print data conversion software is set a predetermined period of time after the startup process of the power supply of the printer is complete. In place of this timing, the print data conversion software transmission request may be issued at another timing before reception of image data. Also, the PC 901 may output a reception request of the print data conversion software, and the printer 12 may send a transmission grant message to the PC 901 in response to this request.

FOURTH EMBODIMENT

Figure 26:
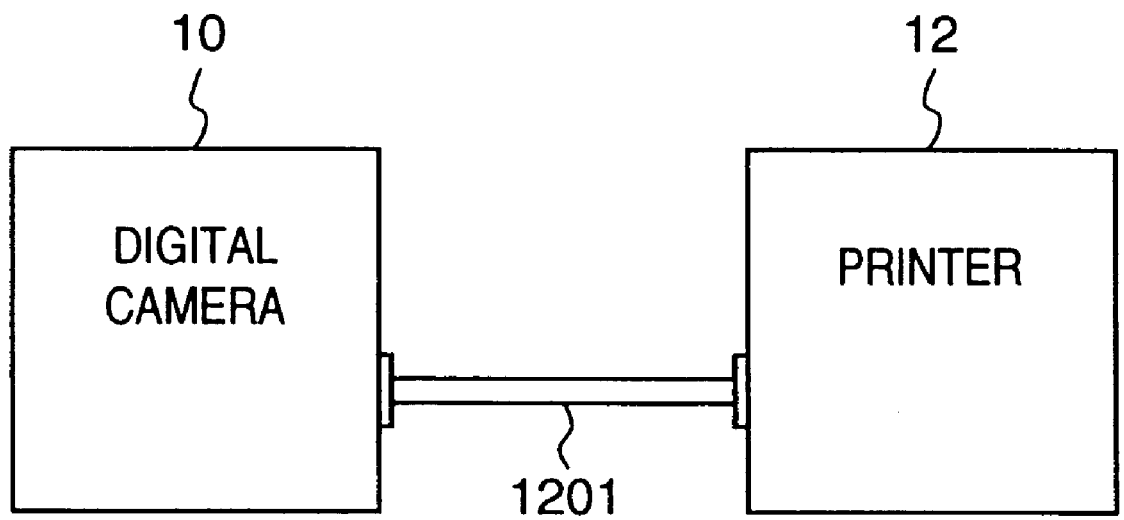
FIG. 26 is a block diagram showing the arrangement of an image processing system.

The fourth embodiment of the present invention will be described below with reference to FIG. 26. FIG. 26 is a block diagram showing the arrangement of an image processing system.

The fourth embodiment is substantially the same as the above-mentioned second embodiment except that communications between a digital camera 10 and printer 12 are done via a serial wired communication means.

In the image processing system of the fourth embodiment, as shown in FIG. 26, the digital camera 10 and printer 12 are connected to each other via a serial communication cable 1201, and serial communications between the digital camera 10 and printer 12 are done in accordance with the USB (Universal Serial Bus) scheme. With communication based on the USB scheme, electric power can be supplied from the printer 12 to the digital camera 10. Note that the IEEE1394 communication scheme may be used in place of the USB scheme.

FIFTH EMBODIMENT

Figure 27:
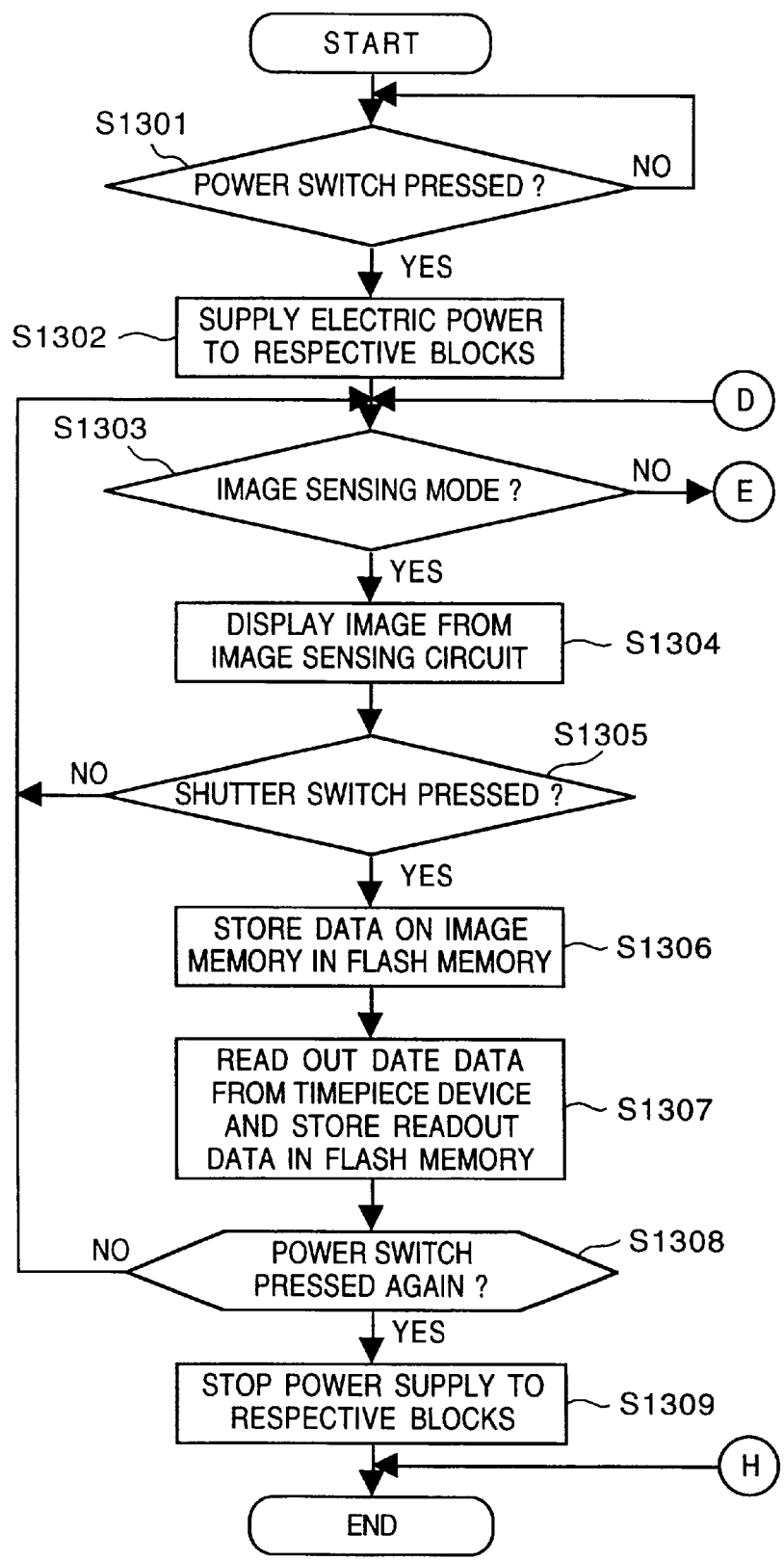
FIG. 27 is a flow chart showing the control operation of the digital camera 10.
Figure 28:
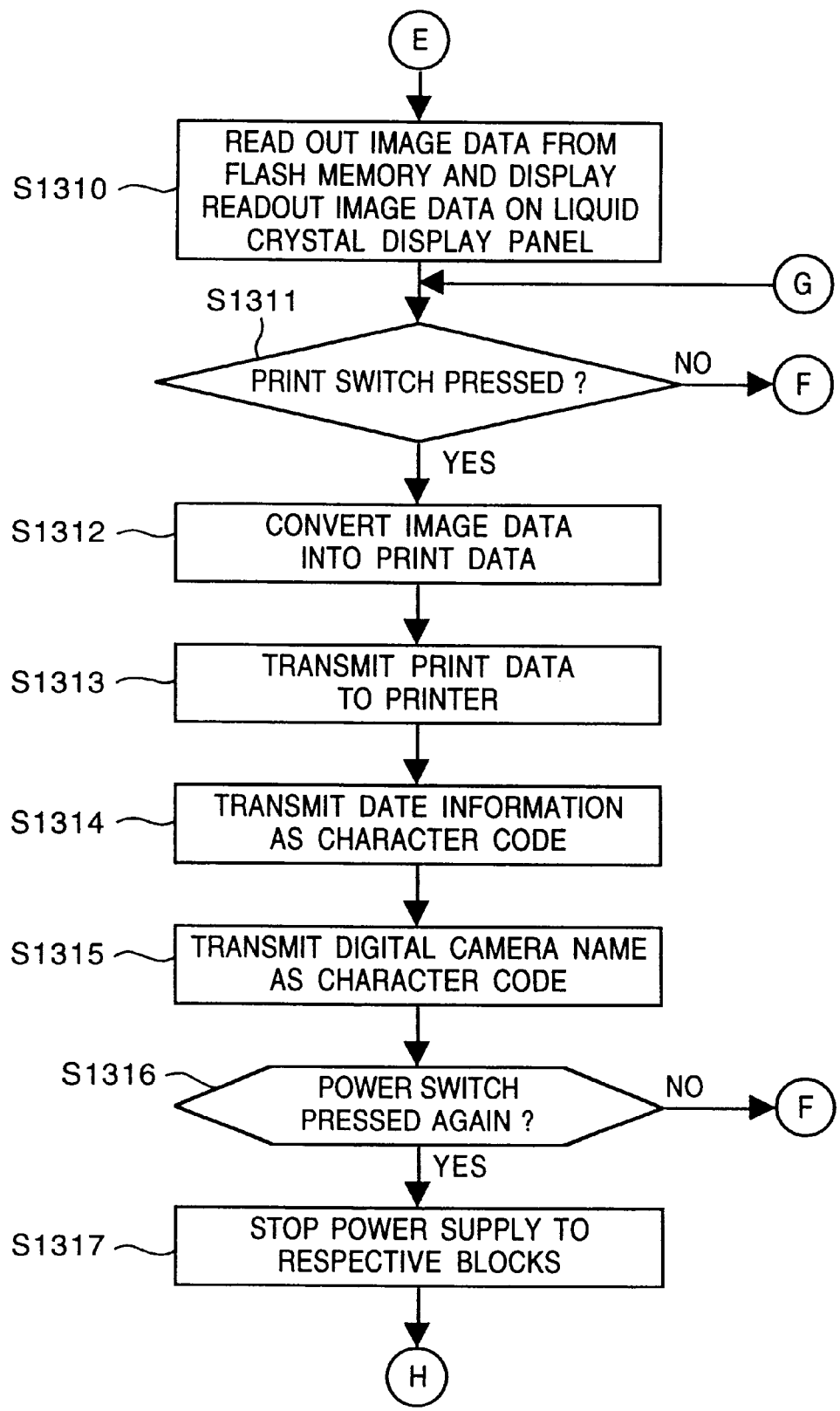
FIG. 28 is a flow chart showing the control operation of the digital camera 10.
Figure 29:
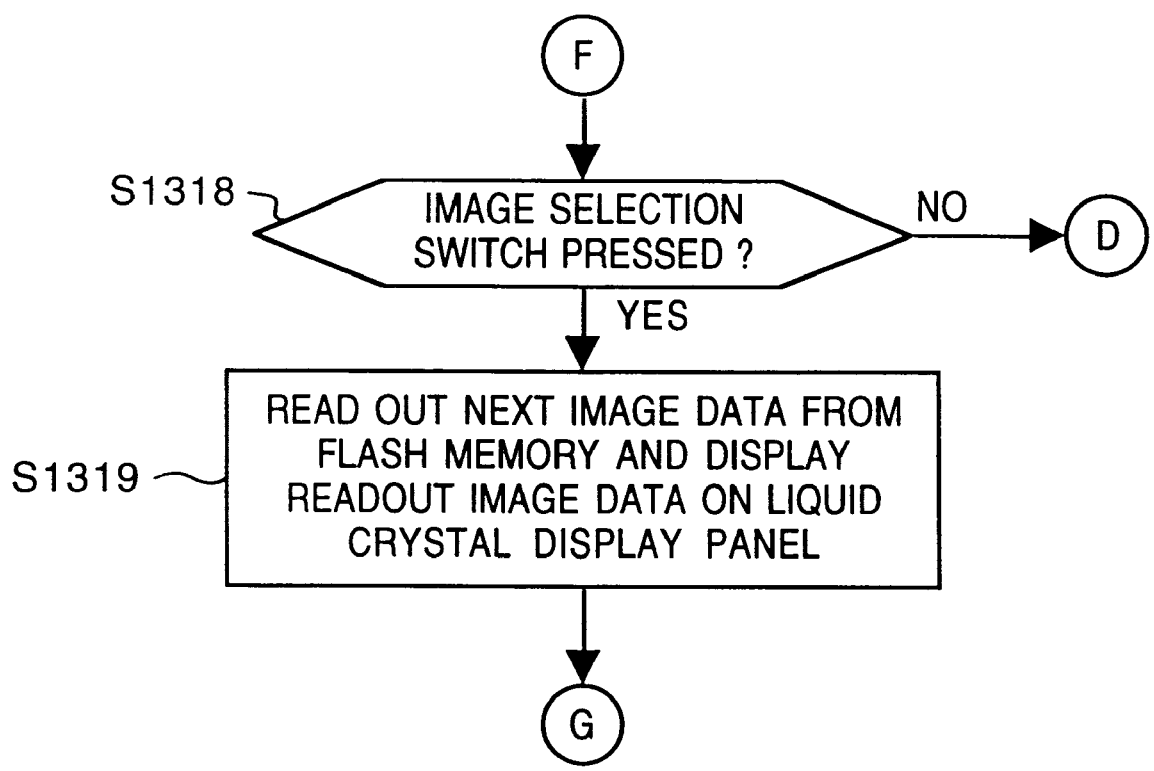
FIG. 29 is a flow chart showing the control operation of the digital camera 10.
Figure 30:
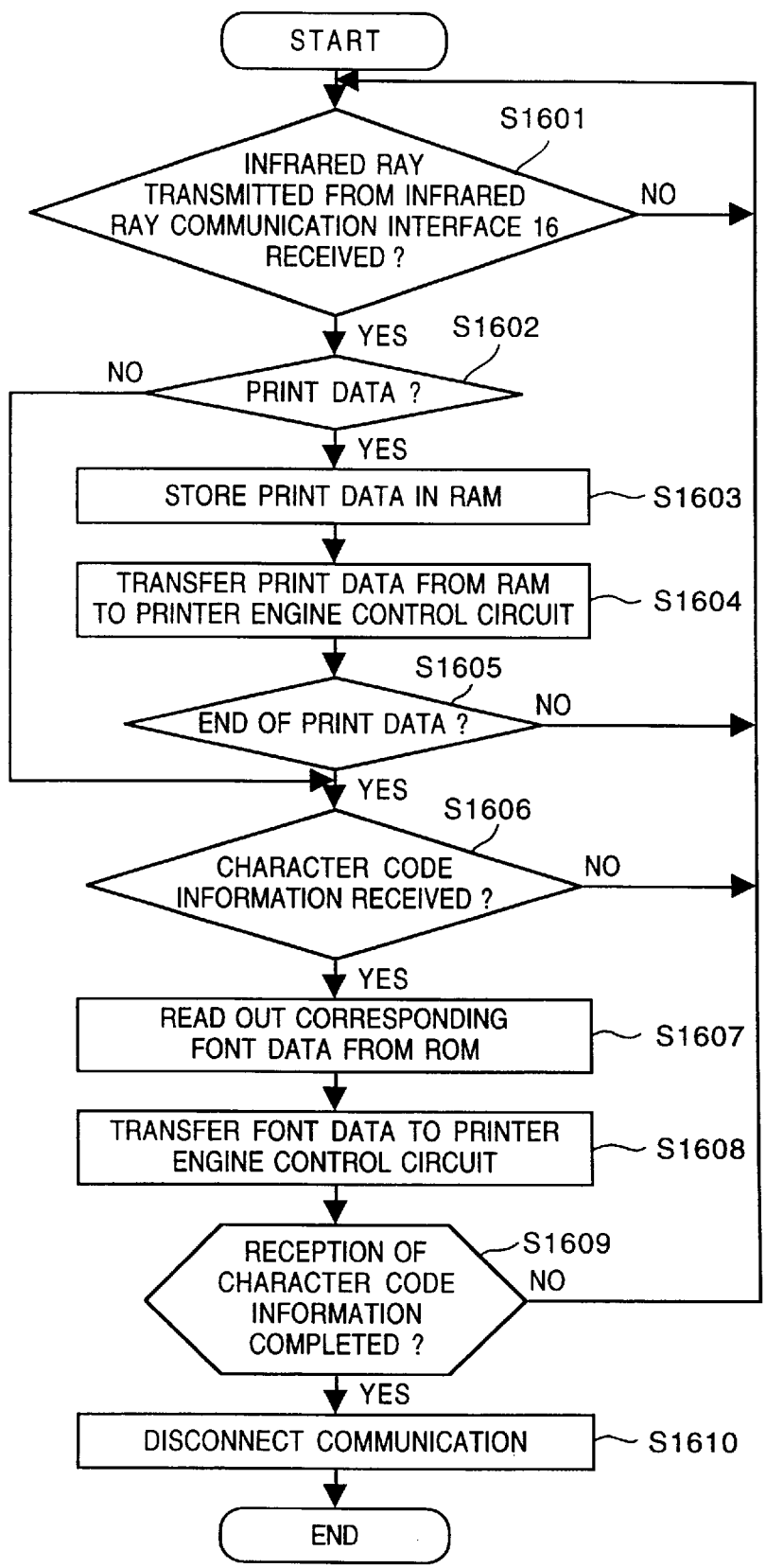
FIG. 30 is a flow chart showing the control operation of the printer 12.
Figure 31:
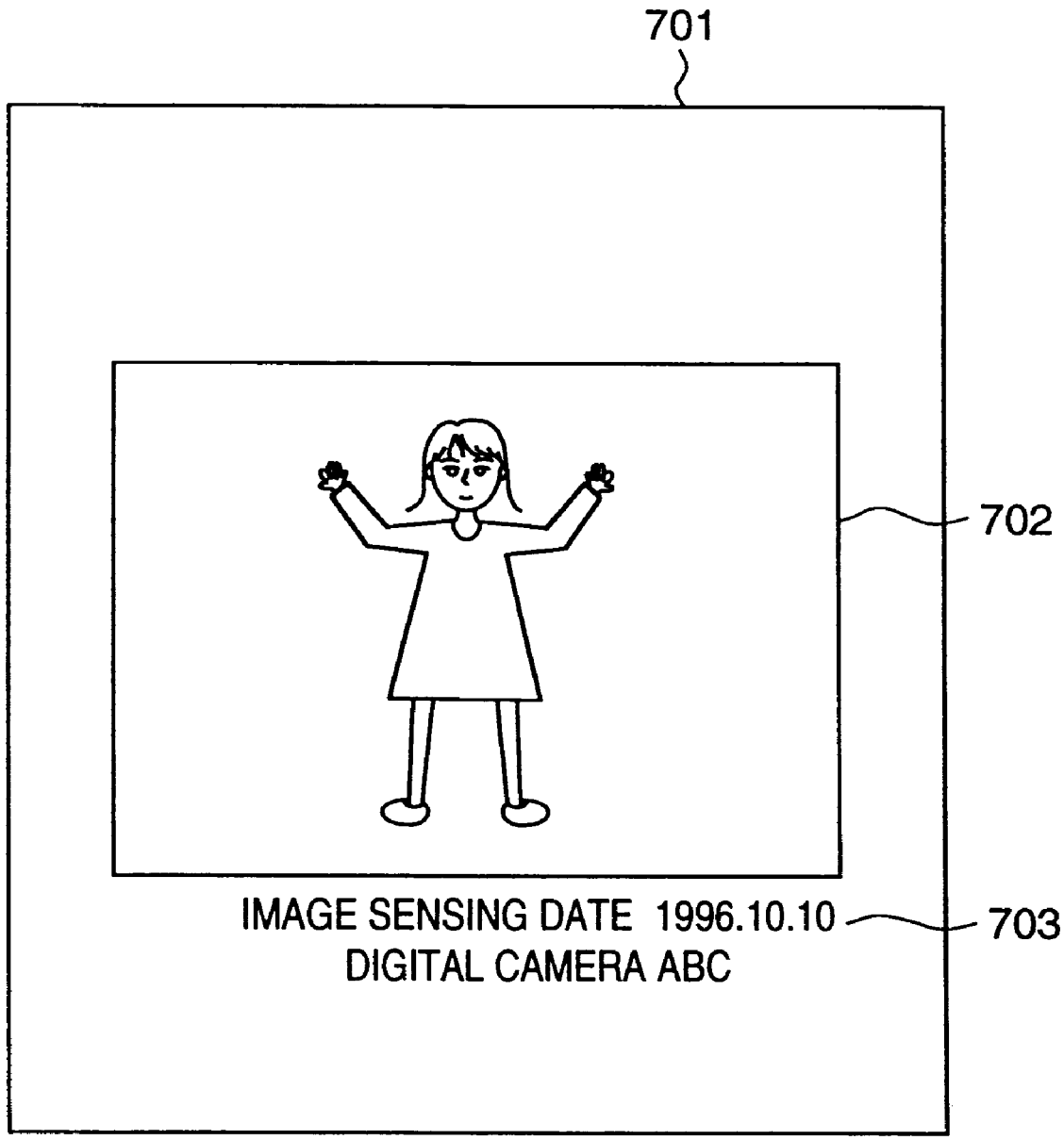
FIG. 31 is a view showing an image to be output from the printer 12.

The fifth embodiment of the present invention will be described below with reference to FIGS. 27 to 31. FIGS. 27 to 29 are flow charts showing the control operation of a digital camera 10. FIG. 30 is a flow chart showing the control operation of a printer 12. FIG. 31 shows an image to be output from the printer 12.

The fifth embodiment is substantially the same as the second embodiment described above, except that the digital camera 10 converts image data into print data via print data conversion software and transmits additional information including date data such as the image sensing time to the printer 12 together with the printer 12, and the printer 12 prints an image on a paper sheet as a print medium on the basis of the received image data and also prints the received additional information on a region outside the print region printed based on the print data. That is, the arrangements of the digital camera 10 and printer 12 and the communication scheme therebetween are the same as those in the second embodiment.

Control by the CPU 20 of the digital camera 10 upon printing an image sensed by the digital camera 10 using the printer will be described below with reference to FIGS. 27 to 29.

As shown in FIG. 27, the CPU 20 waits for depression of the power switch 408 (FIG. 18) in step S1301. Upon depression of the power switch 408, the CPU 20 recognizes the depression of the power switch 408 via the input port 40, and supplies electric power to the individual blocks in step S1302.

The CPU 20 then checks in step S1303 on the basis of the operation state of the mode selection switch 405 (FIG. 18) if an image sensing mode is set. If the image sensing mode is set, the flow advances to step S1304. In step S1304, the CPU 20 controls to convert an image sensed by the image sensing circuit 28 into image data and temporarily store the image data in the image memory 32, and to supply the image data to the display control circuit 36 and display it on the liquid crystal display panel 34. Since the image data is displayed on the liquid crystal display panel 34, the liquid crystal display panel 34 serves as a finder.

In step S1305, the CPU 20 monitors via the input port 40 to see if the shutter switch 404 (FIG. 18) has been pressed. If depression of the shutter switch 404 is not detected, the flow returns to step S1303 to repeat the processing from step S1303. Upon detecting the depression of the shutter switch 404, the flow advances to step S1306, and the CPU 20 stores image data stored in the image memory 32 in a first area of the flash memory 26 via the internal bus 46. Subsequently, in step S1307, the CPU 20 acquires date data from the timepiece device 215, and stores that date data in a second area which is allocated in correspondence with the first area of the flash memory 26.

The flow then advances to step S1308, and the CPU 20 detects the presence/absence of depression of the power switch 404 via the input port 40 again. If the depression of the power switch 404 is not detected, the flow returns to step S1303 above. If the image sensing mode remains set, the CPU 20 repeats the processing from step S1304. Note that the maximum number of times of image sensing is determined by the capacity of the flash memory 26. Upon detecting the depression of the power switch 404, the flow advances to step S1309, and the CPU 20 stops power supply to the individual blocks, thus ending this processing. Since the timepiece device 215 is backed up by the secondary battery 216, it continues the timepiece operation irrespectively of stop of power supply to the individual blocks.

If the CPU 20 determines in step S1303 that a reproduction mode is selected, the flow advances to step S1310 shown in FIG. 28. In step S1310, the CPU 20 controls to read out image data from the flash memory 26 and supply the readout image data to the display control circuit 36 so as to display it on the liquid crystal display panel 34. That is, since the readout image data is displayed on the liquid crystal display panel 34, the liquid crystal display panel 34 serves as a monitor.

Subsequently, in step S1311, the CPU 20 detects via the input port 40 if the print switch 408 (FIG. 18) has been depressed. If depression of the print switch 408 is not detected, the flow advances to step S1318 shown in FIG. 29. In step S1318, the CPU 20 detects via the input port 40 if the image selection switch 406 (FIG. 18) has been pressed. If depression of the image selection switch 406 is detected, the flow advances to step S1319; otherwise, the flow returns to step S1303. In step S1319, the CPU 20 controls to read out the next image data from the flash memory 26 and supply it to the display control circuit 36, thus displaying an image on the liquid crystal display panel 34. After the image data is displayed, the flow returns to step S1311.

Upon detecting the depression of the print switch 408 in step S1311, the flow advances to step S1312, and the CPU 20 reads out image data from the flash memory 26 and converts it into print data using the print data conversion software. Subsequently, in step S1313, the CPU 20 transmits the print data to the printer 12 as infrared rays 14 from the infrared ray communication interface 16. The print data is transmitted from the infrared ray communication interface 16 in the same fashion as in the second embodiment described above.

After the print data is transmitted, the flow advances to step S1314, and the CPU 20 reads out the date data stored in correspondence with the image data from the flash memory 26, converts it into character code data, and transmits the character code data to the printer 12 as infrared rays 14 from the infrared ray communication interface 16. Next, in step S1315, the CPU 20 reads out the name of the digital camera 10, which is pre-stored in the ROM 22, converts it into character code data, and transmits the character code data to the printer 12 as infrared rays 14 from the infrared ray communication interface 16.

The flow then advances to step S1316, and the CPU 20 detects the presence/absence of depression of the power switch 404 via the input port 40 again. If the depression of the power switch 404 is not detected, the flow returns to step S1318 (FIG. 29) above. If depression of the image selection switch 406 is detected in step S1318, the flow advances to step S1319. In step S1319, the CPU 20 controls to read out the next image data from the flash memory 26 and supply it to the display control circuit 36, thus displaying an image on the liquid crystal display panel 34. After the readout image data is displayed, the flow returns to step S1311. If depression of the print switch 408 is detected in step S1311, the next print data is converted into print data, and is then transmitted to the printer 12.

Upon detecting the depression of the power switch 404 in step S1316, the flow advances to step S1317, and the CPU 20 stops power supply to the individual blocks, thus ending this processing.

On the other hand, as shown in FIG. 30, in the printer 12, the CPU 50 waits for reception of infrared rays 14 in step S1601. Upon receiving infrared rays 14, the CPU 50 checks in step S1602 if data indicated by the received infrared rays 14 is print data. If print data is received, the CPU 50 temporarily stores the received print data in the RAM 54 in step S1603, and transfers the print data stored in the RAM 54 to the printer engine control circuit 64 via the internal bus 68 in step S1604. Upon receiving print data, the printer engine control circuit 64 controls the printer engine 66 to print a corresponding image on a paper sheet on the basis of the print data.

The flow advances to step S1605, and the CPU 50 checks if printing of the print data is complete. If the printing of the print data is not complete yet, the flow returns to step S1601 to repeat the processing from step S1601 to step S1605 until the printing of the print data is complete.

Upon completion of printing of the print data, the flow advances to step S1606, and the CPU 50 waits until it receives character code information transmitted after the print data from the digital camera 10. Upon receiving the character code information, the flow advances to step S1607, and the CPU 50 reads out font data corresponding to the received character code information from the ROM 52. In step S1608, the CPU 50 transfers the readout font data to the printer engine control circuit 64 via the internal bus 68. Upon receiving the font data, the printer engine control circuit 64 controls the printer engine 66 to print corresponding characters on a region outside the image printed region on the paper sheet on the basis of the font data.

The flow then advances to step S1609, and the CPU 50 checks if printing of the character code information is complete. If the printing of the character code information is not complete yet, the flow returns to step S1601, and the CPU 50 repeats the processing from step S1601 to step S1609 via steps S1602 and S1606 until the printing of the character code information is complete.

Upon completion of printing of the character code information, the flow advances to step S1610, and the CPU 50 disconnects the communication connection with the digital camera 10 in accordance with the IrDA communication protocol. Thereafter, the paper sheet is output, and this processing ends.

In this manner, the printer outputs a paper sheet on which the image (the selected image displayed on a liquid crystal display panel) sensed by the digital camera 10 is printed, and date information and the name of the digital camera are printed on the region outside the image printed region. As shown in FIG. 31, on an output paper sheet 701, an image (the selected image displayed on the liquid crystal display panel) 702 sensed by the digital camera 10 is printed, and date information and a name (ABC) 703 of the digital camera 10 are printed on the region (lower region in FIG. 31) outside the printed region of the image 702.

As described above, in the image processing system of the fifth embodiment, when an image sensed by the digital camera 10 is printed by the printer 12, the image sensed by the digital camera 10 can be directly printed by the printer 12 without interposing any personal computer between the digital camera 10 and printer 12, by making infrared ray communications between the digital camera 10 and printer 12. Also, since additional information corresponding to an image sensed by the digital camera is transmitted together with that sensed image, and the printer 12 prints the additional information of that image on the region outside the image printed region, the user can detect the image sensing date, digital camera 10 used, and the like on the basis of the additional information, and can easily manage sensed images using printed paper sheets.

Note that the fifth embodiment uses additional information including date data such as an image sensing date, and the name of the digital camera 10. Also, additional information including the shutter speed, the selected image sensing mode such as a closeup mode, wide-angle mode, telephoto mode, or the like, the number of pixels, the compression ratio of image data, and the like may be stored in correspondence with image data, and may be printed together with the image data. In this case, the user can recognize the image sensing conditions and setting contents in detail on the basis of the printed results.

On the other hand, the digital camera 10 may comprise a means for appropriately selecting items of additional information.

Furthermore, the items of additional information may include a title, image sensing location, weather, memorandum, and the like as those to be input using keys, and upon selecting these items, corresponding information may be written using keys.

SIXTH EMBODIMENT

Figure 32:
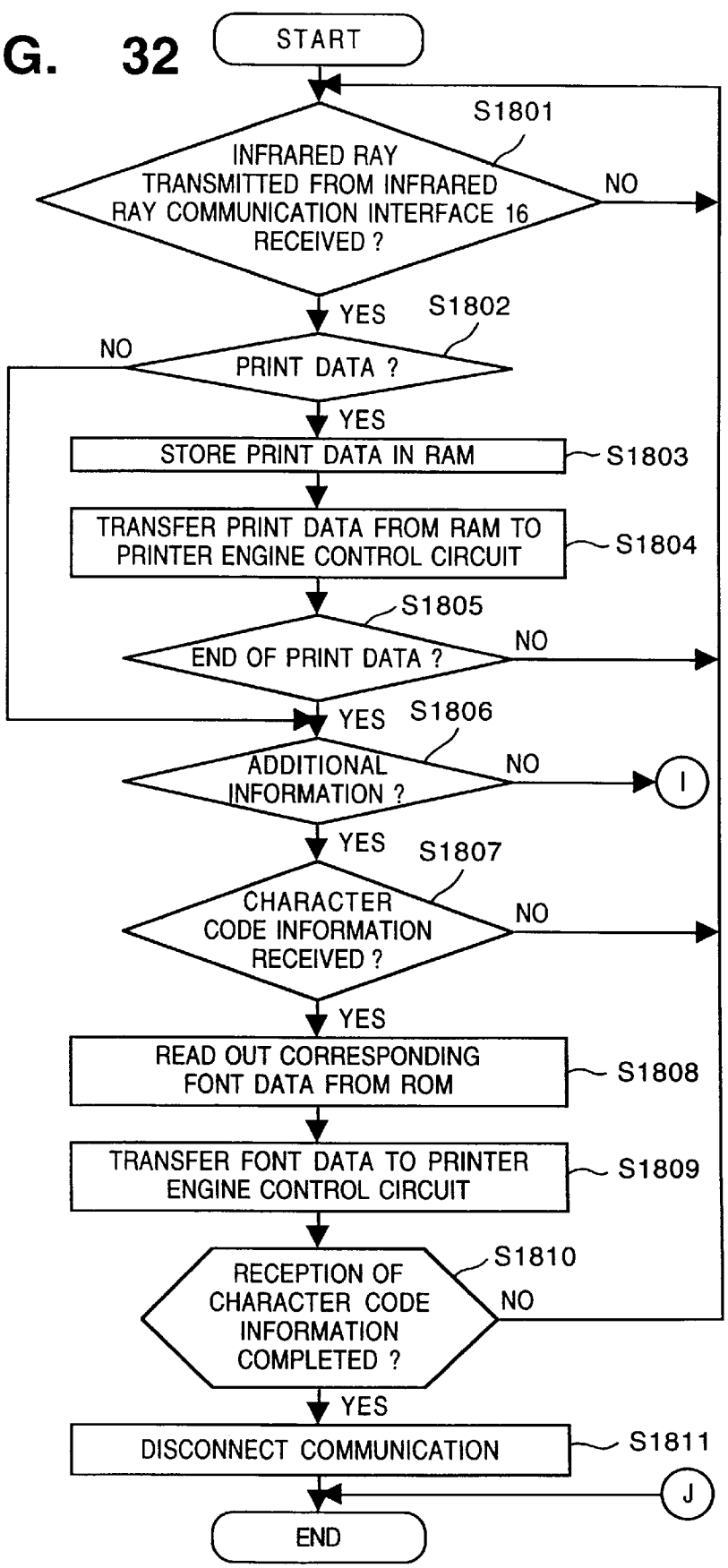
FIG. 32 is a flow chart showing the control operation of the printer 12.
Figure 33:
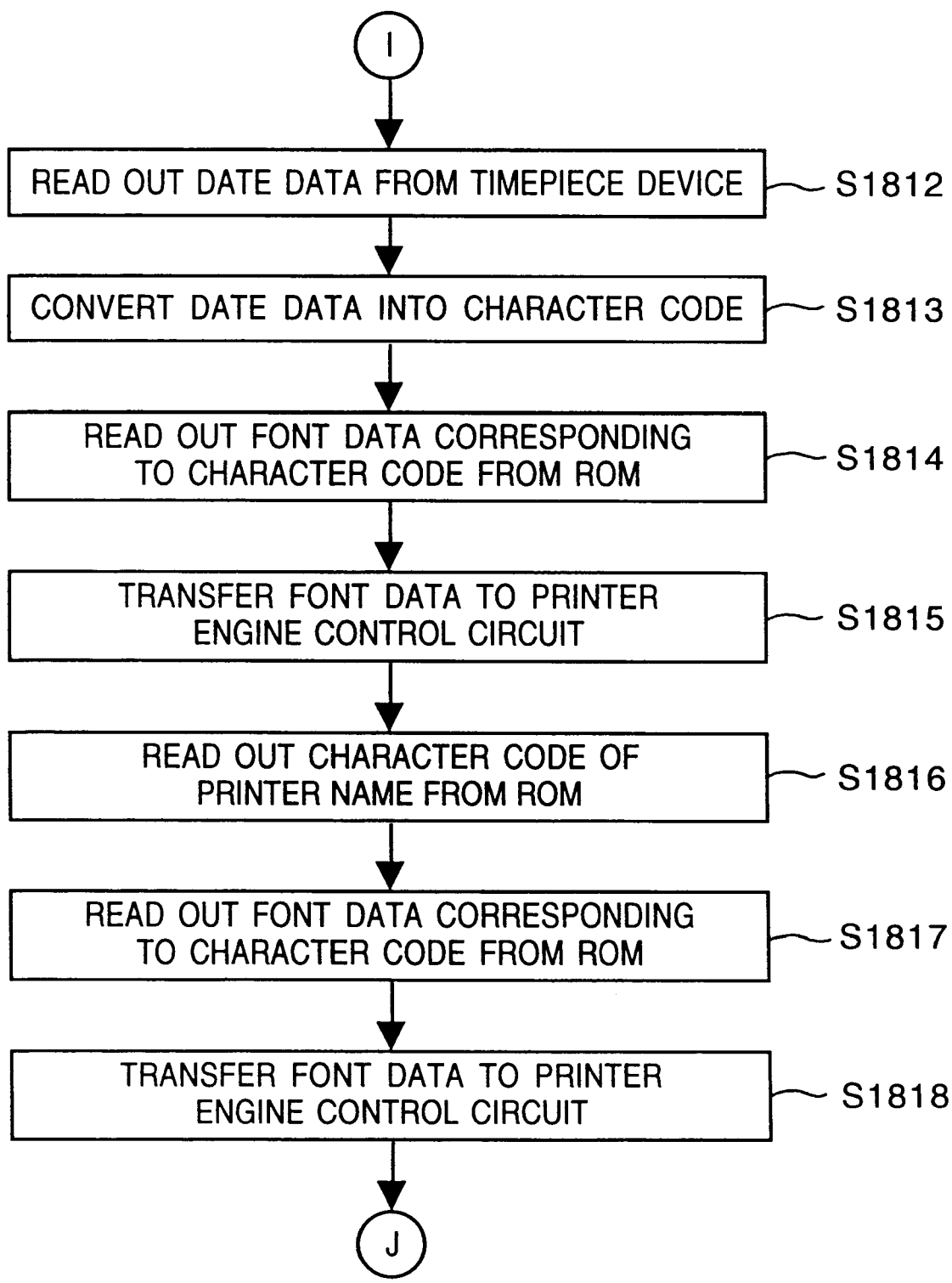
FIG. 33 is a flow chart showing the control operation of the printer 12.
Figure 34:
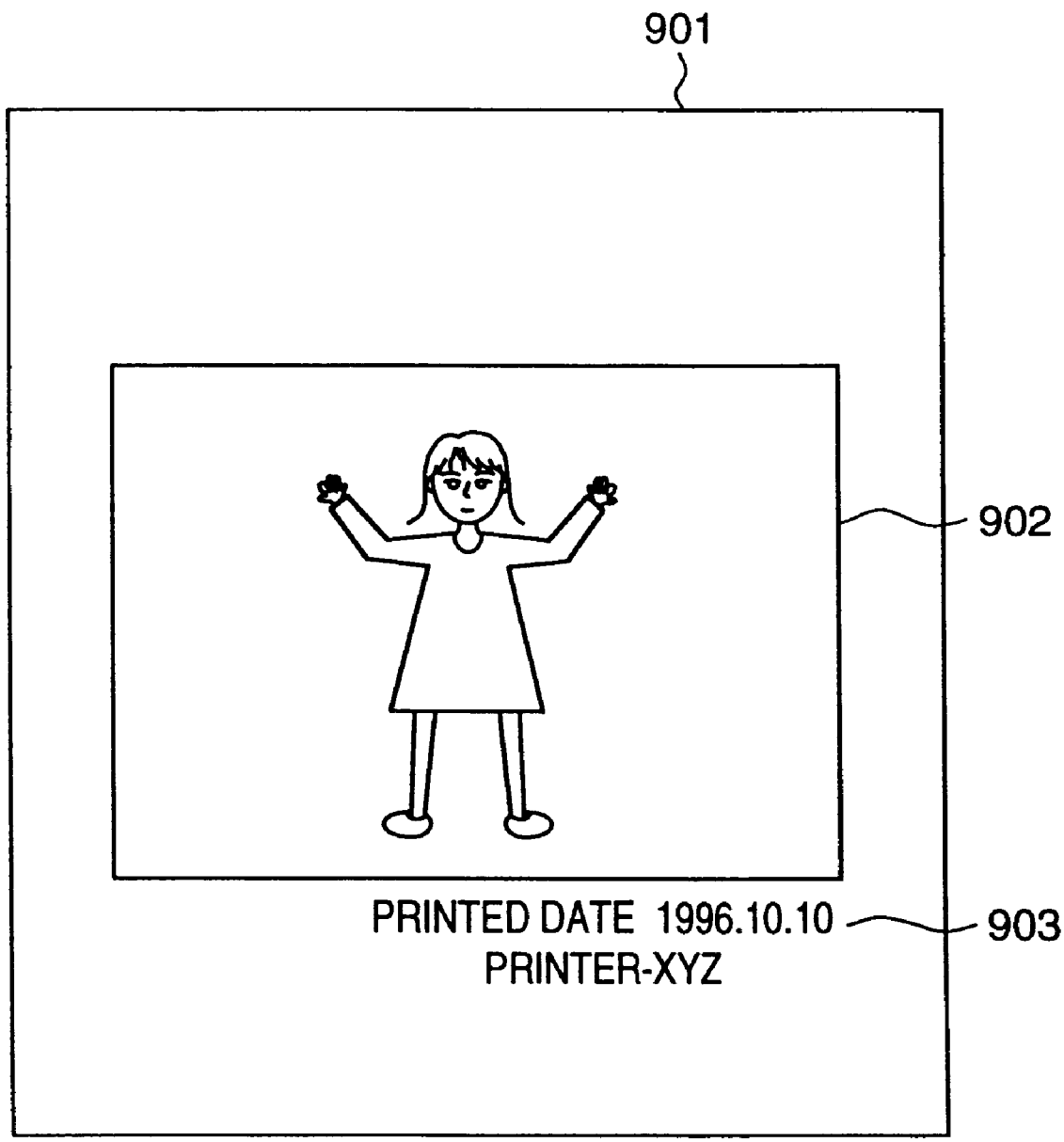
FIG. 34 is a view showing an image to be output from the printer 12.

The sixth embodiment of the present invention will be described below with reference to FIGS. 32 to 34. FIGS. 32 and 33 are flow charts showing the control operation of the printer 12. FIG. 34 shows an image to be output from the printer 12.

The sixth embodiment is substantially the same as the above-mentioned fifth embodiment, except that when the digital camera 10 does not transmit any additional information to the printer 12, the printer 12 generates additional information and prints the generated additional information on a region outside the image printed region. That is, the arrangements of the digital camera 10 and printer 12 and communication scheme therebetween are the same as those in the fifth embodiment.

In the sixth embodiment, as shown in FIG. 32, the processing contents in steps S1801 to S1811 are the same as those in steps S1601 to S1610 shown in FIG. 30 in the fifth embodiment described above, except for step S1806. An explanation of the steps with the same processing contents will be omitted or briefly given, and steps with different processing contents will be described in detail below.

As shown in FIG. 32, upon completion of printing of print data, the CPU 50 checks in step S1806 if additional information is transmitted from the digital camera 10 together with the print data. If additional information is not transmitted, the flow advances to step S1812 shown in FIG. 33. The CPU 50 acquires date data from the timepiece device 312 in step S1812, and converts the acquired date data into character code data in step S1813, as shown in FIG. 33.

The flow then advances to step S1814, and the CPU reads out font data corresponding to the character code data from the ROM 52. In step S1815, the CPU 50 transfers the readout font data to the printer engine control circuit 64 via the internal bus 68. Upon receiving the font data, the printer engine control circuit 64 controls the printer engine 66 to print corresponding characters (printed date) on a region outside the image printed region on the basis of the font data.

The flow advances to step S1816, and the CPU 50 acquires character code data of the printer name from the ROM 52. Subsequently, the CPU 50 reads out font data corresponding to the acquired character code data from the ROM 52 in step S1817, and transfers the readout font data to the printer engine control circuit 64 via the internal bus 68 in step S1818. Upon receiving the font data, the printer engine control circuit 64 controls the printer engine 66 to print corresponding characters (printer name) on a region outside the image printed region on the basis of the font data.

Finally, the flow advances to step S1811, and the CPU 50 disconnects the communication connection with the digital camera 10 in accordance with the IrDA communication protocol. Thereafter, a paper sheet is output, and this processing ends.

As described above, when the digital camera 10 does not transmit any additional information, the printer 12 generates additional information (printed date, printer name), and outputs a paper sheet on which the image sensed by the digital camera 10 is printed, and the generated additional information is printed on the region outside the image printed region. As shown in FIG. 34, on an output paper sheet 901, an image (the selected image displayed on the liquid crystal display panel) 902 sensed by the digital camera 10 is printed, and the printed date and a printer name (XYZ) 903 are printed on the region (lower region in FIG. 34) outside the printed region of the image 902.

In summary, in the image processing system of the sixth embodiment, when the digital camera 10 does not transmit any additional information, the printer 12 generates additional information, and prints it on the region outside the image printed region. For this reason, the user can detect the image printed data, printer used, and the like on the basis of the additional information, and can estimate the image sensing date of the printed image on the basis of the printed date and the like.

As described above, according to the present invention, the image processing system which can easily print an image sensed by the digital camera using a printer can be provided.

Also, the digital camera and printing apparatus used in the above-mentioned image processing system can be provided.

OTHER EMBODIMENT

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention the following claims are made.

What is claimed is:

1. An image processing system having a digital camera for sensing an image and generating image data, and a printing apparatus for printing an image on a print medium on the basis of print data,
wherein said digital camera comprises:
data conversion means for converting the image data into the print data; and
first communication means for directly communicating with said printing apparatus without passing through a personal computer, and
said printing apparatus comprises:
second communication means for directly communicating with said digital camera.

2. The system according to claim 1, wherein said first and second communication means make a radio communication.

3. The system according to claim 1, wherein said first and second communication means make an infrared ray communication.

4. The system according to claim 3, wherein the infrared ray communication is based on IrDA.

5. The system according to claim 3, wherein the infrared ray communication is based on ASK.

6. The system according to claim 1, wherein said data conversion means converts the image data into the print data by executing data conversion software.

7. The system according to claim 1, wherein said digital camera further comprises a memory for storing data conversion software for converting image data sensed by said digital camera into print data.

8. The system according to claim 1, wherein said digital camera further comprises setting means for setting image quality of an image to be printed.

9. The system according to claim 8, wherein said digital camera further comprises display means for displaying an image sensed by said digital camera, and
the image quality is set using a menu displayed on said display means.

10. The system according to claim 1, wherein said digital camera further comprises image variable-magnification means for performing variable-magnification processing of image data, and said data conversion means converts the image data subjected to the variable-magnification processing into the print data.

11. The system according to claim 1, wherein said digital camera further comprises setting means for setting a size of a print medium on which an image is formed on the basis of image data, and said data conversion means performs variable-magnification processing in correspondence with the set size of the print medium.

12. The system according to claim 11, wherein said setting means sets the size of the print medium on the basis of information obtained via a communication with said printing apparatus.

13. An image processing system having a digital camera for sensing an image and generating image data, and a printing apparatus for printing an image on a print medium on the basis of print data, wherein said digital camera comprises:
first communication means for communicating with said printing apparatus; and
execution means for executing software received by said first communication means, said printing apparatus comprises:
second communication means for communicating with said digital camera; and
storage means for storing data conversion software for converting the image data into the print data, and
said printing apparatus transmits the data conversion software to said digital camera.

14. The system according to claim 13, wherein said execution means transmits, to said printing apparatus, print data obtained by converting the image data into the print data by executing the received data conversion software.

15. The system according to claim 13, wherein said first and second communication means make a radio communication.

16. The system according to claim 13, wherein said first and second communication means make an infrared ray communication.

17. The system according to claim 16, wherein the infrared ray communication is based on IrDA.

18. The system according to claim 16, wherein the infrared ray communication is based on ASK.

19. The system according to claim 13, wherein said digital camera further comprises a memory for storing the data conversion software.

20. The system according to claim 13, wherein said digital camera further comprises setting means for setting image quality of an image to be printed.

21. The system according to claim 20, wherein said digital camera further comprises display means for displaying an image sensed by said digital camera, and the image quality is set using a menu displayed on said display means.

22. The system according to claim 13, wherein said digital camera further comprises image variable-magnification means for performing variable-magnification processing of image data, and the data conversion software converts the image data subjected to the variable-magnification processing into the print data.

23. The system according to claim 13, wherein said digital camera further comprises setting means for setting a size of a print medium on which an image is formed on the basis of image data, and the data conversion software performs variable-magnification processing in correspondence with the set size of the print medium.

24. The system according to claim 23, wherein said setting means sets the size of the print medium on the basis of information obtained via a communication with said printing apparatus.

25. An image processing system having a digital camera for sensing an image and generating image data, and a printing apparatus for printing an image on a print medium on the basis of print data, wherein said digital camera comprises:
first communication means for directly communicating with said printing apparatus without passing through a personal computer and an information processing apparatus; and
execution means for executing software received by said first communication means, said printing apparatus comprises:
second communication means for directly communicating with said digital camera, and
said digital camera receives data conversion software for converting the image data into the print data from said information processing apparatus.

26. The system according to claim 25, wherein said execution means transmits, to said printing apparatus, print data obtained by converting the image data into the print data by executing the received data conversion software.

27. The system according to claim 25, wherein said information processing apparatus comprises a personal computer.

28. The system according to claim 25, wherein said first and second communication means make a radio communication.

29. The system according to claim 25, wherein said first and second communication means make an infrared ray communication.

30. The system according to claim 29, wherein the infrared ray communication is based on IrDA.

31. The system according to claim 29, wherein the infrared ray communication is based on ASK.

32. The system according to claim 25, wherein said digital camera further comprises a memory for storing the data conversion software.

33. The system according to claim 25, wherein said digital camera further comprises setting means for setting image quality of an image to be printed.

34. The system according to claim 33, wherein said digital camera further comprises display means for displaying an image sensed by said digital camera, and the image quality is set using a menu displayed on said display means.

35. The system according to claim 25, wherein said digital camera further comprises image variable-magnification means for performing variable-magnification processing of image data, and the data conversion software converts the image data subjected to the variable-magnification processing into the print data.

36. The system according to claim 25, wherein said digital camera further comprises setting means for setting a size of a print medium on which an image is formed on the basis of image data, and the data conversion software performs variable-magnification processing in correspondence with the set size of the print medium.

37. The system according to claim 36, wherein said setting means sets the size of the print medium on the basis of information obtained via a communication with said printing apparatus.

38. An image processing system having a digital camera for sensing an image and generating image data, and a printing apparatus for printing an image on a print medium on the basis of print data,
wherein said digital camera comprises:
first communication means for directly communicating with said printing apparatus without passing through a personal computer,
said printing apparatus comprises:
second communication means for directly communicating with said digital camera; and
data conversion means for converting the image data into the print data, and
said printing apparatus starts said data conversion means and converts the received image data into print data upon receiving image data from said digital camera.

39. The system according to claim 38, wherein said first and second communication means make a radio communication.

40. The system according to claim 38, wherein said first and second communication means make an infrared ray communication.

41. The system according to claim 40, wherein the infrared ray communication is based on IrDA.

42. The system according to claim 40, wherein the infrared ray communication is based on ASK.

43. The system according to claim 38, wherein said first and second communication means make a serial wired communication.

44. The system according to claim 43, wherein the serial wired communication is based on a Universal Serial Bus scheme.

45. The system according to claim 43, wherein the serial wired communication is based on an IEEE1394 scheme.

46. The system according to claim 38, wherein said data conversion means converts the image data into the print data by executing data conversion software.

47. The system according to claim 38, wherein said digital camera further comprises setting means for setting image quality of an image to be printed.

48. The system according to claim 47, wherein said digital camera further comprises display means for displaying an image sensed by said digital camera, and
the image quality is set using a menu displayed on said display means.

49. The system according to claim 38, wherein said printing apparatus comprises an ink-jet printer.

50. An image processing system having a digital camera for sensing an image and generating image data, and a printing apparatus for printing an image on a print medium on the basis of print data,
wherein said digital camera comprises:
storage means for storing data conversion software for converting the image data into the print data; and
first communication means for communicating with said printing apparatus,
said printing apparatus comprises:
second communication means for communicating with said digital camera; and
execution means for executing software received by said second communication means, and
said digital camera transmits the image data and the data conversion software to said printing apparatus.

51. The system according to claim 50, wherein upon receiving the image data and data conversion software from said digital camera, said execution means starts the received data conversion software to convert the received image data into the print data.

52. The system according to claim 50, wherein said first and second communication means make a radio communication.

53. The system according to claim 50, wherein said first and second communication means make an infrared ray communication.

54. The system according to claim 53, wherein the infrared ray communication is based on IrDA.

55. The system according to claim 53, wherein the infrared ray communication is based on ASK.

56. The system according to claim 50, wherein said first and second communication means make a serial wired communication.

57. The system according to claim 56, wherein the serial wired communication is based on a Universal Serial Bus scheme.

58. The system according to claim 56, wherein the serial wired communication is based on an IEEE1394 scheme.

59. The system according to claim 50, wherein said digital camera further comprises setting means for setting image quality of an image to be printed.

60. The system according to claim 59, wherein said digital camera further comprises display means for displaying an image sensed by said digital camera, and
the image quality is set using a menu displayed on said display means.

61. The system according to claim 50, wherein said printing apparatus comprises an ink-jet printer.

62. An image processing system having a digital camera for sensing an image and generating image data, and a printing apparatus for printing an image on a print medium on the basis of print data,
wherein said digital camera comprises:
first communication means for communicating with said printing apparatus,
said printing apparatus comprises:
second communication means for communicating with said digital camera and an information processing apparatus; and
execution means for executing software received by said second communication means, and
said execution means receives data conversion software for converting image data generated by said digital camera into print data from said information processing apparatus, starts the received data conversion software upon receiving image data from said digital camera, and converts the received image data into print data.

63. The system according to claim 62, wherein said first and second communication means make a radio communication.

64. The system according to claim 62, wherein said first and second communication means make an infrared ray communication.

65. The system according to claim 64, wherein the infrared ray communication is based on IrDA.

66. The system according to claim 64, wherein the infrared ray communication is based on ASK.

67. The system according to claim 62, wherein said first and second communication means make a serial wired communication.

68. The system according to claim 67, wherein the serial wired communication is based on a Universal Serial Bus scheme.

69. The system according to claim 67, wherein the serial wired communication is based on an IEEE1394 scheme.

70. The system according to claim 62, wherein said digital camera further comprises setting means for setting image quality of an image to be printed.

71. The system according to claim 70, wherein said digital camera further comprises display means for displaying an image sensed by said digital camera, and the image quality is set using a menu displayed on said display means.

72. The system according to claim 62, wherein said printing apparatus comprises an ink-jet printer.

73. The system according to claim 62, wherein said information processing apparatus comprises a personal computer.

74. An image processing system having a digital camera for sensing an image and generating image data, and a printing apparatus for printing an image on a print medium on the basis of print data, wherein said digital camera comprises:
first additional information generation means for generating additional information of the image data;
first communication means for directly communicating with said printing apparatus without passing through a personal computer; and
data conversion means for converting the image data into the print data, said printing apparatus comprises:
second communication means for directly communicating with said digital camera and an information processing apparatus; and
second additional information generation means for generation additional information of the print data received from said digital camera, said digital camera converts the image data into the print data using said data conversion means and transmits the print data alone or the print data and additional information to said printing apparatus, wherein when print data and additional information are received from said digital camera, said printing apparatus prints an image represented by the received print data on the print medium, and prints the received additional information on a region outside the image printed region.

75. The system according to claim 74, wherein when said printing apparatus receives the print data alone, said printing apparatus generates additional information using said second additional information generation means, prints an image represented by the received print data on the print medium, and prints the additional information generated by said second additional information generation means on a region outside the image printed region.

76. The system according to claim 74, wherein said first and second communication means make a radio communication.

77. The system according to claim 74, wherein said first and second communication means make an infrared ray communication.

78. The system according to claim 77, wherein the infrared ray communication is based on IrDA.

79. The system according to claim 77, wherein the infrared ray communication is based on ASK.

80. The system according to claim 74, wherein said first and second communication means make a serial wired communication.

81. The system according to claim 80, wherein the serial wired communication is based on a Universal Serial Bus scheme.

82. The system according to claim 80, wherein the serial wired communication is based on an IEEE1394 scheme.

83. The system according to claim 74, wherein said data conversion means converts the image data into the print data by executing data conversion software.

84. The system according to claim 74, wherein said digital camera further comprises setting means for setting image quality of an image to be printed.

85. The system according to claim 84, wherein said digital camera further comprises display means for displaying an image sensed by said digital camera, and the image quality is set using a menu displayed on said display means.

86. The system according to claim 74, wherein said printing apparatus comprises an ink-jet printer.

87. The system according to claim 74, wherein the additional information includes date data indicating an image sensing date of the image.

88. The system according to claim 74, wherein the additional information includes a name of said digital camera or said printing apparatus.

89. The system according to claim 74, wherein the additional information is transmitted as a character code from said digital camera to said printing apparatus.

90. A digital camera for an image processing system having a digital camera for sensing an image and generating image data, and a printing apparatus for printing an image on a print medium on the basis of print data, comprising:

communication means for directly communicating with said printing apparatus without passing through a personal computer,
wherein the image data is transmitted to said printing apparatus via said communication means.

91. A printing apparatus for an image processing system having a digital camera for sensing an image and generating image data, and a printing apparatus for printing an image on a print medium on the basis of print data, comprising:

communication means for directly communicating with said digital camera without passing through a personal computer; and
data conversion means for converting image data received by said communication means into print data,
wherein when the image data is received from said digital camera via said communication means, said data conversion means is started.

92. A printing apparatus for an image processing system having a digital camera for sensing an image and generating image data, and a printing apparatus for printing an image on a print medium on the basis of print data, comprising:

communication means for communicating with said digital camera; and
execution means for executing software received by said communication means,
wherein upon receiving image data and data conversion software from said digital camera, said execution means starts the received data conversion software, and converts the received image data into print data.

93. A digital camera for an image processing system having a digital camera for sensing an image and generating image data, and a printing apparatus for printing an image on a print medium on the basis of print data, comprising:

data conversion means for converting the image data into the print data; and communication means for transmitting the print data directly to said printing apparatus without passing through a personal computer.

94. A printing apparatus for an image processing system having a digital camera for sensing an image and generating image data, and a printing apparatus for printing an image on a print medium on the basis of print data, comprising:

communication means for communicating with said digital camera and an information processing apparatus; and execution means for executing software received by said communication means, wherein said execution means receives data conversion software from said information processing apparatus, and upon receiving image data from said digital camera, said execution means starts the received data conversion software to convert the received image data into print data.

95. A printing apparatus for an image processing system having a digital camera for sensing an image and generating image data, and a printing apparatus for printing an image on a print medium on the basis of print data, comprising:

communication means for directly communicating with said digital camera without passing through a personal computer; and additional information generation menas for generating additional information of the print data received from said digital camera, wherein when print data and additional information are received from said digital camera, said printing apparatus prints an image represented by the received print data on the print medium, and prints the received additional information on a region outside the image printed region.

96. The apparatus according to claim 95, wherein when the print data alone is received from said digital camera, said printing apparatus generates additional information using said additional information generation means, prints an image represented by the received print data on the print medium, and prints the additional information generated by said additional information generation means on the region outside the image printed region.

97. An image processing method comprising the steps of:

converting image data corresponding to an image sensed by a digital camera into print data for a printing apparatus for forming an image on a print medium, so as to print the image by the printing apparatus; and transmitting the converted print data directly to the printing apparatus without passing through a personal computer.

98. An image processing method comprising the steps of:

receiving, by a digital camera, data conversion software transmitted from a printing apparatus for forming an image on a print medium;

converting image data generated by the digital camera into print data for the printing apparatus using the data conversion software; and transmitting the converted print data to the printing apparatus.

99. An image processing method comprising the steps of:

receiving, by a digital camera, data conversion software transmitted from an information processing apparatus;

converting image data generated by the digital camera into print data for a printing apparatus using the data conversion software; and transmitting the converted print data to the printing apparatus.

100. An image processing method comprising the steps of:

receiving, by a printing apparatus, data conversion software and image data generated by a digital camera, which are transmitted from the digital camera; and converting the received image data into print data for forming an image on a print medium using the received data conversion software.

101. An image processing method comprising the steps of:

receiving, by a printing apparatus, data conversion software transmitted from an information processing apparatus and image data generated by a digital camera; and converting the received image data into print data for forming an image on a print medium using the received data conversion software.

102. An image processing method comprising the steps of:

generating additional information corresponding to image data generated by a digital camera;

converting the image data into print data for a printing apparatus;

transmitting the converted print data and the additional information directly to the printing apparatus without passing through a personal computer; and printing an image represented by the print data on a print medium and the additional information on a region outside the image printed region using the printing apparatus.

103. An image processing method comprising the steps of:

converting image data generated by a digital camera into print data for a printing apparatus;

transmitting the converted print data directly to the printing apparatus without passing through a personal computer;

generating additional information corresponding to the received print data by the printing apparatus; and printing an image represented by the print data on a print medium and the additional information on a region outside the image printed region using the printing apparatus.

104. A computer program product comprising a computer readable medium having computer program code, for executing image processing, said product including:

conversion process procedure codes for converting image data corresponding to an image sensed by a digital camera into print data for a printing apparatus for forming an image on a print medium, so as to print the image by the printing apparatus; and transmission process procedure codes for transmitting the converted print data to the printing apparatus.

105. A computer program product comprising a computer readable medium having computer program code, for executing image processing, said product including:

reception process procedure codes for receiving, by a digital camera, data conversion software transmitted from a printing apparatus for forming an image on a print medium;

conversion process procedure codes for converting image data generated by the digital camera into print data for the printing apparatus using the data conversion software; and transmission process procedure codes for transmitting the converted print data to the printing apparatus.

106. A computer program product comprising a computer readable medium having computer program code, for executing image processing, said product including:

reception process procedure codes for receiving, by a digital camera, data conversion software transmitted from an information processing apparatus;

conversion process procedure codes for converting image data generated by the digital camera into print data for a printing apparatus using the data conversion software; and transmission process procedure codes for transmitting the converted print data to the printing apparatus.

107. A computer program product comprising a computer readable medium having computer program code, for executing image processing, said product including:

reception process procedure codes for receiving, by a printing apparatus, data conversion software and image data generated by a digital camera, which are transmitted from the digital camera; and conversion process procedure codes for converting the received image data into print data for forming an image on a print medium using the received data conversion software.

108. A computer program product comprising a computer readable medium having computer program code, for executing image processing, said product including:

first reception process procedure codes for receiving, by a printing apparatus, data conversion software transmitted from an information processing apparatus;

second reception process procedure codes for receiving, by the printing apparatus, image data generated by and transmitted from a digital camera; and conversion process procedure codes for converting the received image data into print data for forming an image on a print medium using the received data conversion software.

109. A computer program product comprising a computer readable medium having computer program code, for executing image processing, said product including:

generation process procedure codes for generating additional information corresponding to image data generated by a digital camera;

conversion process procedure codes for converting the image data into print data for a printing apparatus;

transmission process procedure codes for transmitting the converted print data and the additional information directly to the printing apparatus without passing through a personal computer; and print process procedure codes for printing an image represented by the print data on a print medium and the additional information on a region outside the image printed region using the printing apparatus.

110. A computer program product comprising a computer readable medium having computer program code, for executing image processing, said product including:

conversion process procedure codes for converting image data generated by a digital camera into print data for a printing apparatus;

transmission process procedure codes for transmitting the converted print data directly to the printing apparatus without passing through a personal computer;

generation process procedure codes for generating additional information corresponding to the received print data by the printing apparatus; and print process procedure codes for printing an image represented by the print data on a print medium and the additional information on a region outside the image printed region using the printing apparatus.

* * * * *

UNITED STATES PATENT AND TRADEMARK OFFICE
CERTIFICATE OF CORRECTION

PATENT NO. : 6,115,137
DATED : September 5, 2000
INVENTOR(S) : Isamu Ozawa et al.

It is certified that error appears in the above-identified patent and that said Letters Patent is hereby corrected as shown below:

<u>Title page,</u>
Item [75], the inventors' addresses should read as follows:
-- Isamu Ozawa, Kanagawa-ken; Kuniaki Ohtsuka, Kanagawa-ken, both of Japan --

Signed and Sealed this

Second Day of April, 2002

*Attest:*

*Attesting Officer*

JAMES E. ROGAN
*Director of the United States Patent and Trademark Office*